US011238408B2

(12) United States Patent
Kim et al.

(10) Patent No.: US 11,238,408 B2
(45) Date of Patent: Feb. 1, 2022

(54) INTERACTIVE ELECTRONIC EMPLOYEE FEEDBACK SYSTEMS AND METHODS

(71) Applicant: Next Jump, Inc., New York, NY (US)

(72) Inventors: Yong-Chul Charles Kim, New York, NY (US); Meghan Messenger, New York, NY (US); Greg Kunkel, New York, NY (US); Thomas Fuller, New York, NY (US)

(73) Assignee: Next Jump, Inc., New York, NY (US)

( * ) Notice: Subject to any disclaimer, the term of this patent is extended or adjusted under 35 U.S.C. 154(b) by 0 days.

(21) Appl. No.: 16/795,509

(22) Filed: Feb. 19, 2020

(65) Prior Publication Data

US 2020/0265365 A1 Aug. 20, 2020

Related U.S. Application Data

(60) Provisional application No. 62/807,693, filed on Feb. 19, 2019.

(51) Int. Cl.
*G06Q 10/10* (2012.01)
*G06Q 10/06* (2012.01)

(52) U.S. Cl.
CPC ....... *G06Q 10/10* (2013.01); *G06Q 10/06398* (2013.01)

(58) Field of Classification Search
None
See application file for complete search history.

(56) References Cited

U.S. PATENT DOCUMENTS 8,332,232 B2  12/2012  Nickerson et al.
9,349,299 B1   5/2016  Thom
(Continued)

FOREIGN PATENT DOCUMENTS

WO    WO2016/131108    8/2016

OTHER PUBLICATIONS

Aniket et al, Pairing based onion routing with improved forward secrecy, ACM Transactions on Information and System Security TISSEC, 13 4, 1-32, Dec. 2010 https://dl.acm.org/doi/abs/10.1145/1880022.1880023 (Year: 2010).*

(Continued)

*Primary Examiner* — Octavian Rotaru
(74) *Attorney, Agent, or Firm* — Fox Rothschild LLP

(57) ABSTRACT

The systems and methods involve a feedback application, a feedback processing application, an analytics application, and an event moderating application. The feedback application allows users to submit feedback and displays received feedback anonymously to feedback recipients. The feedback processing application anonymizes the submitted feedback and the data to be retrieved from the feedback processing application and provide the anonymized feedback and data to the feedback application. The feedback processing application includes technology to protect feedback giver's identity and increase the speed of anonymizing the feedback and data and providing the anonymized feedback and data to the feedback application. The analytics application examines user's feedback giving and receiving behavior and evaluate their feedback empathy and authenticity and their learning behavior. The event moderating application can control the feedback application and access data in the feedback processing application and the analytics application.

25 Claims, 16 Drawing Sheets

(56) References Cited

U.S. PATENT DOCUMENTS

| | | | |
|---|---|---|---|
| 9,846,896 B2 | 12/2017 | Shah | |
| 2004/0138944 A1 | 7/2004 | Whitacre et al. | |
| 2005/0076089 A1 | 4/2005 | Fonseca | |
| 2007/0067405 A1 | 3/2007 | Eliovson | |
| 2008/0104128 A1* | 5/2008 | Drayer | G06F 21/6254 |
| 2008/0235336 A1* | 9/2008 | Stern | H04L 63/0407 |
| | | | 709/206 |
| 2010/0153453 A1* | 6/2010 | Knowles | G06Q 10/107 |
| | | | 707/784 |
| 2012/0096074 A1* | 4/2012 | McCall | G06F 3/0481 |
| | | | 709/203 |
| 2012/0124057 A1 | 5/2012 | Daoud et al. | |
| 2012/0221936 A1* | 8/2012 | Patterson | G06Q 20/123 |
| | | | 715/230 |
| 2013/0282446 A1 | 10/2013 | Dobell | |
| 2013/0311588 A1* | 11/2013 | Huang | H04L 51/14 |
| | | | 709/206 |
| 2014/0006310 A1 | 1/2014 | Hamilton, II et al. | |
| 2014/0017646 A1 | 1/2014 | Seitzberg, III et al. | |
| 2014/0114876 A1 | 4/2014 | Montano | |
| 2014/0162240 A1* | 6/2014 | Wheeler | G09B 7/00 |
| | | | 434/362 |
| 2014/0164073 A1 | 6/2014 | Mosley et al. | |
| 2014/0379424 A1* | 12/2014 | Shroff | G06Q 30/0204 |
| | | | 705/7.31 |
| 2015/0095083 A1* | 4/2015 | Signer | G09B 5/00 |
| | | | 705/7.15 |
| 2015/0120390 A1 | 4/2015 | Pace | |
| 2015/0242780 A1 | 8/2015 | Besner | |
| 2016/0065884 A1* | 3/2016 | Di Censo | G06F 3/005 |
| | | | 386/227 |
| 2016/0260044 A1 | 9/2016 | Sabei et al. | |
| 2016/0321408 A1* | 11/2016 | Harmon | G16H 80/00 |
| 2017/0053299 A1* | 2/2017 | Rozga | G06Q 30/0203 |
| 2017/0116555 A1 | 4/2017 | Griffin | |
| 2017/0169390 A1 | 6/2017 | Wesselink | |
| 2017/0171118 A1 | 6/2017 | Arzoumanian | |
| 2018/0007405 A1* | 1/2018 | McLean | H04L 65/602 |
| 2018/0069849 A1 | 3/2018 | Kraemer et al. | |
| 2018/0158085 A1 | 6/2018 | Wohlwend et al. | |
| 2018/0189691 A1* | 7/2018 | Oehrle | G06Q 10/063 |
| 2018/0189810 A1* | 7/2018 | Greenberger | G06Q 30/0203 |
| 2018/0359293 A1* | 12/2018 | Faulkner | H04L 65/403 |
| 2019/0366557 A1* | 12/2019 | Gewickey | B25J 11/0005 |

OTHER PUBLICATIONS

Bill Schreiner, Amazon's Snitch Tool, Amazon distorts the very purpose of feedback and gives the word "Feedback" a black eye, 5 pages Published on Aug. 19, 2015 [Retrieved Jul. 10, 2018] https://www.linkedin.com/pulse/amazons-anonymous-snitch-tool-bill-schreiner.

Phil Haussler Ways to Fix Amazon's Anytime Feedback Tool, The QWork Future, Where awesome workplaces grow Published Aug. 19, 2015, 6 pages [Retrieved Jul. 10, 2018] https://www.quantumworkplace.com/future-of-work/4-ways-fix-amazons-anytime-feedback-tool/.

Blind, How we got 1 in 6 Microsoft employees to join our anonymous messaging app, Anonymous Community App for the Workplace, TeamBlind Dec. 22, 2016 (16 pages) [Retrieved Jul. 10, 2018] https://hackernoon.com/how-we-got-1-in-6-microsoft-employees-to-join-our-anonymous-app-74ff6916bebd.

Marck C. Crowley, This Revolutionary Tool Can Help Keep Employees Happy, Engaged, and on Side, Work Smart, Oct. 7, 2013 [Retrieved Jul. 10, 2018] https://www.fastcompany.com/3019393/this-revolutionary-tool-can-help-keep-employees-happy-engaged-and-on-your-side (14 pages).

https://meet.ps/posts/using-anonymous-feedback-to-increase-employee-engagement/Liz Holland, Using Anonymous Feedback to Increase Employee Engagement—Meeting Pulse, Mar. 17, 2017 [Retrieved Jul. 10, 2018] https://meet.ps/posts/using-anonymous-feedback-to-increase-employee-engagement/.

International Search Report and Written Opinion, PCT/US2020/018907, dated May 19, 2020.

* cited by examiner

① VOLUME and PARTICIPATION Feedback Stats weekly, quarterl, yearly
- Unique pieces of feedback
- Unique givers
- Unique receivers
- Average rating score given ② Tags (briefing meetings) driving the feedback

TOP MEETING TAGS

INTERACTIVE ELECTRONIC EMPLOYEE FEEDBACK SYSTEMS AND METHODS

CROSS-REFERENCE TO RELATED APPLICATION(S)

This application claims the benefit of U.S. Provisional Application 62/807,693, filed on Feb. 19, 2019, the entirety of which is herein incorporated by reference.

FIELD OF THE INVENTION

The present invention is generally related to the field of human resources technology including employee feedback systems and cognitive development of employees.

BACKGROUND OF THE INVENTION

Human resources technology is a rapidly growing supported by growing recognition that company requires better tools for supporting company's overall growth and competitiveness. A significant amount of time and resources has been directed in the industry to developing interactive tools, systems, software or other computer-implemented resources that improves human resources related functions and operations. Various challenges can exist related, for example, to effectiveness, value provided, ease of use, adoption, objectiveness, and technical implementation. Two areas of human resources technology development that are pertinent are in employee evaluation and feedback systems. Employee evaluation and feedback technology are distinct in that evaluation is directed to the employer evaluating the employee's performance over a period of time such as current fiscal year and to issuing an evaluation that communicates the employer's assessment of the employees handling of his or her responsibilities over that period while feedback is directed to receiving input on how an individual employee performed or how he or she can improve on a particular activity, event, task, or meeting. Another component of human resources technology is the development of employee's cognitive skills such as their ability to make decisions or develop good judgment. Very little focus has directed in human resources ("FIR") technology to the latter in known systems.

Also, organizations such as corporations, nonprofits, and governments typically exhibit a distinct corporate or organizational culture. Aspects of corporate culture include corporate norms, values, and behaviors of employees. Negative corporate culture or negative aspects of corporate culture may cause increased employee turnover, reduced employee productivity, or reduced employee engagement. Another aspect of known systems is that human resources technology does not appear to provide the ability to evaluate "good" developmental behavior and may not be tailored to different cultures (e.g., those that the culture seeks as good behaviors).

HR departments and other managements at many organizations may also attempt to improve aspects of corporate culture. However, attempts at improving culture by organizations may be based on intuition or anecdotal data. There are computing systems that may allow a human resources department to generate surveys that may be completed by employees. The responses gathered by such systems, however, are structured and biased by the questions outlined by the survey. Moreover, since the aim of the data collection is generally directed to organizational performance measurement, the systems do not really capture employee's feedback comments. As such, those computing systems only allow organizations to obtain limited data and perform limited analysis on survey results.

Organizations may also use internal feedback mechanisms. Known feedback mechanisms, however, suffer several drawbacks. One drawback is that some systems do not provide a flexible means to capture feedback giver's genuine message and transmit the message to feedback recipient in an immediate fashion. Some known systems limit user's feedback by only allowing them to select limited, predetermined words, phrases, and sentences and delaying the messages for a period of time. Some known systems involve a human to first read and filter the messages. For example, a feedback supervisor may be assigned to accept or reject a feedback before it is sent to the intended individual. The feedback supervisor may reject or delete a message he determines to be inappropriate such that the message is never sent to the individual. The feedback supervisor may, also reject a message he determines to be inappropriate and ask the feedback giver to revise such that there is a lengthy delay between the moment the feedback giver sends the message and the moment the feedback recipient receives the message. Another known drawback in some systems is that some systems do not adequately protect feedback giver's anonymity. Some known systems guard feedback giver's anonymity by assigning pseudonyms to feedback givers. The true identifiers of those pseudonyms, however, could potentially be estimated through an analysis of which pseudonyms are part of what communication flows (or possibly monitoring traffic). Moreover, in known system the database storing the sender information is not sufficiently protected to prevent unauthorized access (e.g., in some case, the database is on the same enterprise network that the employees are using).

Yet another drawback is that some anonymous feedback systems could lead to abuse by peers. Since the identities of the feedback givers would not be known, the feedback providers may use the system to disparage or demote coworker, sabotage others feelings, and encourage conflicts when the received feedback can be tied to the recipient's annual performance evaluation for determining his promotion, raise, and/or bonus.

Moreover, conventional feedback systems lack a tool that can help feedback givers and recipients to develop cognitive skills. There are no feedback systems that build this training tool into the exercise of giving feedback to others. There are also no technologies that can integrate this type of training into the feedback system or a user interface of the feedback system satisfactorily.

Accordingly, there remains a need for HR technology related to feedback systems that is improved over the prior art.

SUMMARY OF THE INVENTION

In accordance with principles of the present invention, a system for implementing interactive anonymous feedback is contemplated. The system comprises an electronic device including a microprocessor and memory storing a feedback software application. The execution of the feedback software application causes the microprocessor to provide a user interface on the electronic device for selecting an individual and entering a feedback message for the individual.

The user interface includes a freestyle text area allowing a user of the electronic device to compose a feedback message with the user's own words, a send command allowing the user to send the composed feedback message to a computer system over a network, and a public feed allowing the user to view feedback messages and recipient of the feedback messages.

The electronic device further includes a network connection interface that allows the electronic device to communicate with a computer system over a network, and is configured by, the feedback software application to transmit the composed feedback message and a sender identifier identifying the user composed the message to the computer system over the network via the network connection interface in response to the user selecting the send command.

The system comprises a server including a microprocessor, memory storing a feedback processing software application, and a network connection interface that allows the server to communicate with a computer system over a network. The execution of the feedback processing software application allows the microprocessor to receive data that includes the composed feedback message and identifier over the network via the network connection interface of the server, and establish an application environment including a service application, a first database, and a data cache and retrieval system.

The service application is configured to save the received data in the first database, duplicate the received data, remove the sender identifier from the duplicated data, and save the duplicated data without the sender identifier to the data cache & retrieval system and transmit data in the data cache & retrieval system to the electronic device.

The first database is implemented with securities measures or security configuration that prevents unauthorized access to the sender identifier.

The data cache and retrieval system includes a database, an index mechanism, and a cache mechanism. The database is configured to store the duplicated data without the sender identifier, the index mechanism is configured to search index the stored duplicated data without the sender identifier, and allow the service application to access the stored duplicated data without the sender identifier in the database using the index, and the cache mechanism is configured to temporarily store duplicated data without sender identifier that has been previously accessed by the service application; and The service application is further configured to transmit the duplicated data without the sender identifier in the data cache and retrieval system to the electronic device and other electronic devices implemented with feedback software application. The duplicated data without the sender identifier includes the composed feedback message. The service application is further configured to allow the electronic device and the other electronic devices to display the feedback message and identity of the recipient of the feedback message in the teed without showing the sender identifier, such that the identity of the user or feedback message sender is unknown to other users of the other electronic devices and the recipient.

In one embodiment, the user interface includes a list of individuals selectable as a feedback message recipient, and name of the user of the electronic device or feedback message sender appears in the list. The server is configured to communicate with an employee database of an institution containing employee identity information and obtain the list from the employee database.

In one embodiment, the execution of the feedback software application causes the microprocessor to authenticate the user of the electronic device or feedback message sender before providing access to the user interface. The step of authenticating requires the user or sender to enter a user ID and a password and checks the entered user ID and password with information stored in an authentication system.

In one embodiment, the security measures or security configuration on the first database includes application level and database level restrictions. The application level restrictions limit software applications that can read from and write into the first database and the database level restrictions limit users who can access the first database.

In one embodiment, the execution of the feedback processing software application further allows the microprocessor of the server to transmit the duplicated data without the sender identifier to the electronic device for displaying on the public feed in response to a request sent by the public feed.

In one embodiment, the electronic device is configured to communicate with the server to receive other feedback messages without sender identifiers and display the other feedback messages without sender identifiers on the public feed of the electronic device.

In one embodiment, the user interface further includes a feedback rating scale allowing the user of the electronic device to a select a feedback rating for the recipient, and the selected feedback rating is transmitted to the server with the feedback message, sent to the electronic device from the server with the feedback message, and displayed on the public feed with the feedback message.

In one embodiment, the public feed displays a vote command allowing the user to select up vote or down for feedback messages display in the public feed.

In one embodiment, the execution of the feedback processing software application further allows the microprocessor of the server to establish a reporting environment that is configured to access data in the data cache and retrieval system and perform a sentient analysis on the composed feedback message.

In one embodiment, the system further comprises a second electronic device including a microprocessor and memory storing an analytics software application. The execution of the analytics software application allows the microprocessor to communicate with the server and the feedback processing software application implemented on the server, and evaluate individuals feedback giving behavior and evaluate those individuals based on the feedback messages they composed. The step of evaluating includes analyzing the composed feedback message by using large sets of terms, words, and synonyms, generating metrics representing user's feedback giving empathy and authenticity and user's learning behavior, identifying users fall under each generated metric using the analysis, and communicating a visual indicator showing the generated metrics and identified users under each generated metric.

In one embodiment, memory further comprises an event moderating software application and execution of the event moderating software application allows the microprocessor of the server to implements a timer that is configured to set a first duration using the timer for a person listed on the user interface of the feedback software application who is required perform an activity, set a second duration using the timer for a first group of users to compose a feedback message on the feedback software application for the activity performed by the person, and set a third duration using the timer for a second group of users that is different from the first group to compose a feedback message on the feedback software application for the activity performed by the person.

In one embodiment, the execution of the event moderating software application further allows the microprocessor of the server to communicate with a plurality of electronic devices implemented with the feedback software application, and enable and disable the functionalities of the freestyle text area and send command in the plurality of electronics devices. The event moderating software enables the functionalities of the freestyle text area and send command so that users can compose a message in the freestyle and select the send command only in the second and third durations.

In one embodiment, the data received by the server includes feedback messages and identifiers received from the second and third durations.

In one embodiment, the execution of the event moderating software application further allows the microprocessor of the server to access the sentiment analysis by the feedback processing software application and communicate the analysis to the users through visual representations.

In one embodiment, the sender identifier is encrypted by the data cache and retrieval system using a public key and is accessible by the reporting environment. The reporting environment uses the encrypted sender identifier to identify feedback messages from the user corresponding to the sender identifier and performs the sentiment analysis on the identified feedback messages without knowing identity of the user.

In accordance with principles of the present invention, a method for implementing interactive anonymous feedback is contemplated. The method comprises providing a user interface on an electronic device for selecting an individual and entering a feedback message for the individual. The user interface includes a freestyle text area allowing a user of the electronic device to compose a feedback message with the user's own words, a send command allowing the user to send the composed feedback message to a computer system over a network, and a public feed allowing the user to view feedback messages and recipient of the feedback messages. The method also comprises transmitting the composed feedback message and a sender identifier identifying the user composed the message to a computer system over a network via a network connection interface of the electronic device in response to the user selecting the send command.

The method further comprises receiving data at a server that includes the composed feedback message and identifier over a network via a network connection interface of the server. Additionally, the method comprises establishing an application environment including a service application, a first database, and a data cache and retrieval system.

The service application is configured to save the received data in the first database, duplicate the received data, remove the sender identifier from the duplicated data, and save the duplicated data without the sender identifier to the data cache & retrieval system. The service application is also configured transmit data in the data cache & retrieval system to the electronic device.

The first database is implemented with securities measures or security configuration that prevents unauthorized access to the sender identifier.

The data cache and retrieval system includes a database, an index mechanism, and a cache mechanism. The database is configured to store the duplicated data without the sender identifier. The index mechanism is configured to search index the stored duplicated data without the sender identifier, and allow the service application to access the stored duplicated data without the sender identifier in the database using the index. The cache mechanism is configured to temporarily store duplicated data without sender identifier that has been previously accessed by the service application.

The service application is further configured to transmit the duplicated data without the sender identifier in the data cache and retrieval system to the electronic device and other electronic devices implemented, the duplicated data without the sender identifier includes the composed feedback message. The service application is also configured to allow the electronic device and the other electronic devices to display the feedback message and identity of the recipient of the feedback message in the feed without showing the sender identifier, such that the identity of the user or feedback message sender is unknown to other users of the other electronic devices and the recipient.

In accordance with principles of the present invention, a non-transitory computer readable medium storing one or more software applications that causes a computer system to execute a method. The method comprises providing a user interface on an electronic device for selecting an individual and entering a feedback message for the individual. The user interface includes a freestyle text area allowing a user of the electronic device to compose a feedback message with the user's own words, a send command allowing the user to send the composed feedback message to a computer system over a network, and a public feed allowing the user to view feedback messages and recipient of the feedback messages. The method also comprises transmitting the composed feedback message and a sender identifier identifying the user composed the message to a computer system over a network via a network connection interface of the electronic device in response to the user selecting the send command.

The method further comprises receiving data at a server that includes the composed feedback message and identifier over a network via a network connection interface of the server and establishing an application environment including a service application, a first database, and a data cache and retrieval system.

The service application is configured to save the received data in the first database, duplicate the received data, remove the sender identifier from the duplicated data, and save the duplicated data without the sender identifier to the data cache & retrieval system. The service application is also configured to transmit data in the data cache & retrieval system to the electronic device.

The first database is implemented with securities measures or security configuration that prevents unauthorized access to the sender identifier.

The data cache and retrieval system includes a database, an index mechanism, and a cache mechanism. The database is configured to store the duplicated data without the sender identifier, the index mechanism is configured to search index the stored duplicated data without the sender identifier, and allow the service application to access the stored duplicated data without the sender identifier in the database using the index, and the cache mechanism is configured to temporarily store duplicated data without sender identifier that has been previously accessed by the service application.

The service application is further configured to transmit the duplicated data without the sender identifier in the data cache and retrieval system to the electronic device and other electronic devices implemented. The duplicated data without the sender identifier includes the composed feedback message. The service application is also configured to allow the electronic device and the other electronic devices to display the feedback message and identity of the recipient of the feedback message in the feed without showing the sender identifier, such that the identity of the user or feedback message sender is unknown to other users of the other electronic devices and the recipient.

In accordance with principles of the present invention, a system for implementing interactive anonymous feedback is contemplated. The system comprises a first database configured to store data received by the system. The data received and stored data by the system includes feedback messages, feedback ratings, feedback sender identifiers, and feedback recipient identifiers. The system also comprises a data cache and retrieval system configured to store a copy of the received data. The copy of the received data is without the sender identifiers. The system further comprises an electronic device providing a user interface including a public feed that displays feedback messages and feedback ratings stored in the data cache and retrieval system without the sender identifiers.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

DETAILED DESCRIPTION OF THE INVENTION

Figure 1:
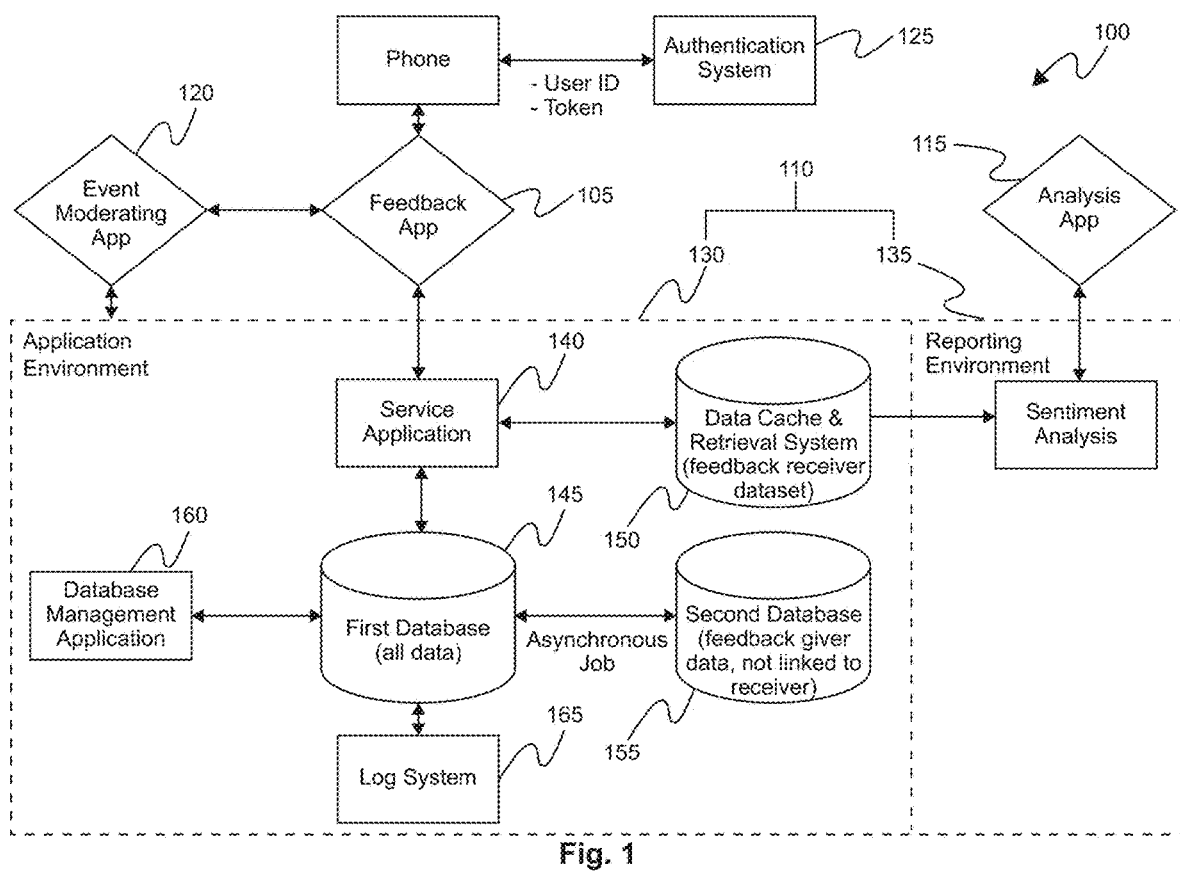
FIG. 1 illustrates one embodiment of the system for developing cognitive skills of individuals in accordance with some embodiments of the invention.
Figure 2:
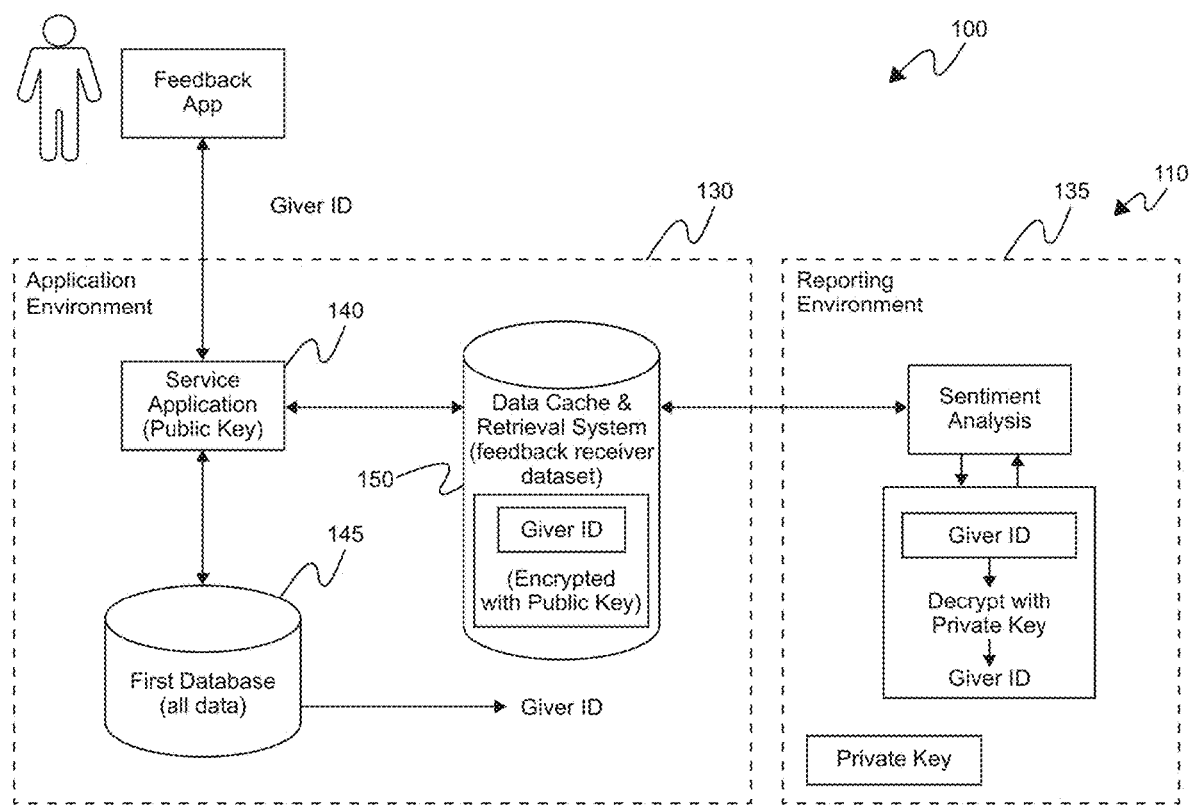
FIG. 2 illustrates another embodiment of the system for developing cognitive skills of individuals in accordance with some embodiments of the invention.

In accordance with the principles of the inventions, advances in HR technology provided by way of interactive computer implemented tools, software processes, and systems that improve on existing employee feedback technology. There are many advantages and valuable aspects of the present technology and few such aspects are initially discussed.

Embodiments of the present invention are directed to a system for implementing interactive electronic anonymous peer to peer employee feedback tools for employees of an enterprise. In at least some embodiments, the system implements an interactive structure that establish an employee to employee feedback arrangement but also has an underlying or related objective of developing the cognitive skills by way of having employees formulate and issue feedback to peers using the particular electronic interface that is provided in the system. As part of the system, mobile feedback applications (e.g., feedback software application) are implemented (on personal mobile devices) that are configured to provide interactive feedback tools to the user on the display of the mobile device.

The mobile feedback application (or sometimes mobile application) is configured to send login and password information to a personal identity service, wherein the personal identity service receives and authenticates the user, provides or sends an electronic security token to the mobile application that mobile application sends to the feedback service (e.g., feedback processing software application) to obtain authorization to operate in the service. The authentication and the system is configured to use the authorization token to enable access to other services offered on the enterprise network of that company or by that enterprise employing that user to gain access to the other services (e.g., to all other services or join the enterprise network and have access to enterprise application such as feedback processing software application). This process provides efficiency in that the user and system do not require separate logins for each of the enterprise's mobile applications on the user's mobile telephone to use to access corresponding services. In addition, it can protect anonymity because it can disassociate the user's login or name from the interactive process in the feedback service. The interactive process in the feedback service can use a numerical or alphanumerical identifier (or other non-descriptive identifier) for communications (in the packets or messages) to the service that would not be understood visually or otherwise easily used to identify the user of the mobile device. In addition, the security process and the use of tokens establish highly secure inter-system relationships and connections (e.g., trusted connections using communications and security protocols) based on identity authentication and security tokens used in messaging. This provides system-level efficiency, for example, in that the additional levels of security checks are not performed to make sure that anonymous feedback messages are not being sent by an individual pretending to be another employee by using the other employee's numerical identifier (e.g., by hacking into the system by send message that confirm to the structure of the messages used in the service). The feedback service, for example, may be the feedback processing software application described below.

The feedback mobile application (e.g., the feedback software application) is configured to provide the user with interactive tools available from one or more display screens displayed by the mobile application. The feedback mobile application is configured to display an option to prepare and send feedback directed to another employee, an option to receive and view feedback (feedback messages) sent to employees at the enterprise (e.g., a "general" or "public" feed), an option to view feedback sent to the current user (e.g., "received" feed), and an option to view feedback that the current user has given to others (e.g., "sent" feed).

The system is configured to provide the employee with an interface on their mobile device wherein the interface provides or consists essentially of an option to select feedback rating and a text area permitted to enter their feedback in freestyle using text entry (and if desired, the option to specify an event such as meeting identifier). The interface may have only or substantially only, the freestyle text and the two options to select a feedback rating and select an event. The system is configured to provide the interface on the user's personal mobile phone by having an application running on the mobile phone. This can provide security, speed of use, and other benefits such as a reduction on employee's hardware resources.

The system (e.g., available on employees mobile phone, which is almost always with a user) provides for quick entry of feedback. The system is configured to provide employee to employee feedback (one to one) and preferably without restrictions such as seniority or role. The system is also configured to display the identity of individual to receive feedback but to maintain the identity of an employee who has given a feedback anonymous. This is configured not to maintain the feedback anonymous and includes an interactive tools on the mobile application that allow each user in the company to view the feedback that has been given in the system, for example, the system stores the feedback and upon selection of an option on each feedback the mobile application sends all of the most recent feedback message to the mobile application to see the feedback activity of other feedback recipients. The system is also configured to display in this "public" feed an interactive option for the viewer to select an up vote or down vote and another interactive option for the viewer to select a red flag command that are received by the mobile application, transmitted to the feedback application server and stored on the server so that other employees can see the up or down vote and the red flag in their mobile application.

The system can implement various technology for protecting the identity of individual user who sent feedback. The system is also focused on being responsive so that user can interact with the mobile application immediately after an activity or event to write and send feedback and for the system to provide the feedback immediately after receiving the feedback to the identified recipient. As such, in some embodiments, the system is configured to operate without applying anonymizing filters or techniques (e.g., no traffic shaping, no use of intermediary server to mask sender identity, no time shifting or randomizing message, which can delay or avoid immediacy of messaging and can add to the processing and/or storage burden of server and mobile telephone) that apply processes to protect against the recipient using information associated with the message to figure out the identity of the feedback giver. As such, the system can be substantially without controls over the timing of messages, the freestyle nature of the messages, or sequence of message to protect anonymity. For example, some known feedback systems provide the user interface different prewritten text that a user can select for sending in the feedback, which is preferably not required.

The system is configured to provide a freestyle text entry area on the mobile application window in which the user can enter text to communicate their thoughts with respect to feedback. This also provides an electronic cognitive development tool that is self-supervised and developed independent of other system participation. The employee must develop their own thoughts on the feedback that they would like to provide to a peer or other employee and potentially self-regulate the impact, fairness, and accuracy of their input. Given the many times activity happens in the workplace, the interactive tool puts the individual in the situation to exercise this thinking many, many times, thus provides an electronic platform for developing the ability of the employee indirectly as part of the feedback system. Conventional systems have focused on the feedback for the individual receiving the feedback, not on the development of employee giving the feedback.

As mentioned, the system is configured to include a "public" feed which can also affect the feedback giver's actions because although his or her identity is anonymous, the feedback given is not confidential and is open to the company employees. The system configures this feed to be available to preferably all employees in the company. The system creates this stream by storing the feedback in an enterprise search engine (that can retrieve data from different database) and maintaining the most recent feedback in a queue for sending to employees when requested.

A related technological aspect is that the "public" teed in combination with other features can achieve a gamification of HR technology such as to provide a mobile application that is engaging to employees by way of its interactive implementation. For example, the ability to send a feedback message to a peer in close time proximity to an activity and the parallel option to view and see other feedback messages to peers (including that peer) in the same time proximity provides the ability to seek and compare the feedback given to the feedback given by others. This can provide a tool for learning, adoption, and growth of the system at the company.

The mobile application (e.g., feedback software application) is preferably configured to be a lightweight application that places minimal processing or storage requirements on the personal mobile telephone. The mobile application generates the interactive display screen; providing interactive tools. The information that is displayed in the mobile application is retrieved after the user opens the application (from a closed state) and is running on the mobile phone. The mobile application will request the information in response to the user selecting an interactive option (e.g., selects to give feedback, and list of employee names are retrieved). An HTTP GET command can be used for this process. For example, when the user selects the option to view the queue or report of employee-to-employee feedback given in the enterprise, the mobile application in response transmits a command requesting the messages. The service (e.g., feedback processing software application) responds by sending a set of the most recent messages that the service received and saved on the enterprise search platform (e.g., system 150 in FIG. 1) implemented in the service. The service can respond by sending a first set and in response to the user scrolling or searching the messages, the service can send supplemental messages to allow the user to see additional messages in the feed. Preferably, the service and mobile device operate in this incremental process rather than to transmit all or a significant portion of the messages to the mobile application which can slow down the mobile phone and the service and can raise security issues.

The mobile application (e.g., feedback software application) uses the local volatile memory (e.g., a cache or memory buffer) of the mobile device to store the information, such as the queue of feedback messages at the company, on the mobile device in supporting the operation of the application including the ability to present display screens that include the received information. Preferably, when the user closes the mobile application on the device, the received information is no longer accessible because it was part of non-volatile memory and it frees up the storage on the mobile telephone for other applications.

The mobile application (e.g., feedback software application) is configured to communicate with a feedback service (e.g., feedback processing software application) implemented on a server using interactive data messaging such as by using HTTP GET and HTTP POST messages. Preferably email protocol messages or chat messaging is avoided and is external to and/or independent from the mobile application. The mobile application prepares messages to interact with the service by creating the data portions of the message and associating related tags, and further using JSON on the mobile phone to prepare communications messages (or packets) on the mobile device, which are transmitted by the mobile device over wireless networks such as WiFi or mobile telephone networks.

The system can be further configured with a meeting software that controls the timing of events at the meeting and provides information on feedback provided by senior attending such as those acting as judges. This again provides an opportunity for the user to use their mobile device to enter feedback and then gain information from the meeting through the meeting application and the feedback application.

Another application that can be configured to work over or in conjunction with this system is an analytics application. The data collected by the system from the feedback can be saved and used in conducting analytics. A software module or process can be configured that is capable of being programmed by the company to specify a history of feedback ratings that matches the objectives of the company such as one that is selected to match the company's culture. In one configuration, the process is configured to read the history of data (feedback rating level e.g., 1, 2, 3, 4) such as for an individual, group, or department and detect in the flow of data pattern that contains a trend of ratings downward and a trend of ratings upward over a specified period of time (e.g., last month or week). The company may seek objective understanding of behaviors that matches the company culture or more generally a culture of learning that is characterized by identifying a data pattern that has these trends running up and down. Other pattern can signify other activity that is relevant to that culture. By applying the configurable process, different companies can determine whether company objective from a cultural perspective is met which can avoid the use of other system such as electronic surveys. This technique is also not conventional in that in conventional system the application displays a rating and in known systems the convention is to look at a flat or increasing rating levels as opposed to using trends to determine desired company behavior.

The system is configured to protect the identity of the feedback giver both at the user interface level and at an internal level. The system is configured to receive feedback messages from the users that were entered and sent from their mobile application. The message contains an identifier (not the name of the individual). The system receives the message and performs an authentication check on the message that is done to check whether it is from a trusted sender. The system performs some additional preliminary processing on the message and after the processing transmits the message to the feedback application service (e.g., service application 140 in FIG. 1), as implemented on a server, in the enterprise network or a network of a cloud service provider. The feedback application service unpacks and saves the information contained in the feedback message in a database. The information saved includes the identifier of the user who sent the message and the text typed in the freestyle feedback entry area and other information in or related to the message such as time sent and meeting tag. The feedback application service is configured as part of an overall system that hides the existence of the database. The database is for example hidden by having service oriented applications (including the feedback service) that are configured together to provide access to the other services by service calls. The database is integrated as part of the application service and because of the service oriented implementation cannot be accessed without going communicating through the feedback application service. In addition, the database can for example be accessed at the database level by way of access provided as part of the database system that is used to implemented the system such by MySQL or Oracle software that is used to implement the database. The database software is configured to have a database administrator and tools to access the database and its contents with database administrator level access. The system can be configured to provide such database administrator access (preventing all other access other than the software requests that are made by the feedback application service). If desired, the database software may have been configured to include an unlocking process that requires keys or passwords from one (two or three) senior officials at the company to enter their key or password and unlock the database and be able to retrieve the association between a feedback message and the identifier of the user who gave that feedback, if desired, the database can be configured to also block the database administer from having access to the data (or the identifier) in the database unless the mentioned one or more keys are provided to the database. This can protect and ensure anonymity of the users in submitting feedback messages.

The feedback application service (e.g., service application 140 in FIG. 1) can be configured to save the received information from feedback messages without the associated identifier for the feedback messages to an operating database or platform. The system is configured to use the operating database to support requests from the feedback application service and support interactions with mobile applications (through the feedback application service) on the mobile telephones of users (e.g., user selects option to see their own feedback, user selects to see feed of feedback message to other employees, user selects to see feedback given). The operating database is preferably a search platform, e.g., an enterprise search platform or web search platform (e.g., SOLR) (that includes a search engine) that is capable of communicating and retrieving information from other databases (can do so quickly) such as accessing an employee database that contains additional information such as employee title or date of hire. The search platform is implemented to provide quick responsiveness to the mobile application. The search platform can be configured to index and search multiple sites and return responses based on the search query (e.g., the search query is a request sent by the mobile feedback application seeking information such as the queue of recent company feedback to other employees). In response, the search platform may have requested information already stored in its database or index and/or issues a request to another database to receive the data or related data and stores the received data in the search platform and uses it to fulfill the query. In supporting the operation of the service, the search platform is devoid of the association of identifiers with feedback messages (or potentially includes an encrypted version) which can protect the anonymity at multiple levels. Additional techniques that are implemented to protect the anonymity of users that provide feedback are also discussed as possible alternatives or combinations with these methods. For example, the public feed can display a plurality of feedback and their recipients but without showing their givers. For another example, the received feed can show the feedback the current user has received but without showing the givers of those feedback.

The implementation of an electronic system that configures anonymous employee feedback to other employees establishes an incumbent platform for use by company employees. It is possible that (for example as a matter of operational or system efficiency) other systems or objectives would be integrated into or combined into the operation of this electronic system. How to implement such integration without negatively impacting the operation and effectiveness of the feedback systems presents a technological problem to developers. By integrating a second application in the feedback system, the company can avoid having to develop and/or institute separate systems or software for the other objective(s). At least in one respect, embodiments of the present integrate an electronic employee training system or cognitive skills development system in a seamless and efficient way into the feedback system. The feedback system is integrated with a user interface for the entry of feedback to other employees using a particular interface that puts the user in a position to freely write the text for a feedback (e.g., without specifying multiple categories of rating criteria or without providing canned language that they could reuse), specify a single rating score, and identify, an event such as meeting to which the feedback is related. In addition, the system provides the user with a separate interface (available at the same time) that the user can select to view (and read) the anonymous feedback given by other employees, which can include feedback being given to the same employee by others who attended the same meeting or event. This electronic exercise for example integrates training of the feedback giver into the system without impacting the operation of the feedback system. This is because, for example, the interface makes the user learn to exercise judgment and decision making in writing the feedback, which can be difficult to do (e.g., employees often rely on their superior's decision making rather than developing their own judgment). The ability to view the "public" feed gives the user the opportunity to compare their feedback (and consequently judgment of the situation) to others (and refine their own skills). Consequently, the system can electronically train users while also providing feedback to employees for their activity. There are existing standalone training applications and cognitive development applications. In some respect, the present feedback system leverages the electronic feedback system to integrate an underlying subtle training application into the employee feedback activity. In addition, the feedback system can be configured to incorporate or use a meeting or event management application to further integrate the electronic training tool with the feedback system.

As discussed below, the system is further enhanced to provide training and input by including an interactive option within the display window generated for the feed of employee feedback that provides the user the ability to up vote or down vote and red flag a particular feedback message (by another user to another employee) and the mobile application transmits the vote and flag (if any) and in response the feedback system stores the voting and flag by users and displays to users who are viewing the feed (e.g., when they refresh their feed if necessary).

The feedback system is further configured to operate quickly and efficiently, and provide immediacy in feedback given and received by for example being implemented without substantial anonymization of messaging or messaging anonymization. Anonymization of messaging refers to the application of a process to the creation, content, transmission, or display of messages that hides the identity the user that provides the feedback. In some known systems, the operation is configured to help to hide identity of the user by having user's select prewritten text for the feedback message, time shift the time when the message is received by the recipient of the feedback, prevent a user to send too many feedback to another user, or send the message to a manager before it can be sent to the employee. These added processes increase the amount of resources directed to the application and can delay (often times by design or because of the processing) the real time or immediacy offered by embodiments of the system.

In operation, for example, the entered feedback message, the selected rating level, and tag if any is sent by the mobile application to the feedback application service and that same content is transmitted by the application service to intended recipient of the feedback and to "public" feed without modification or without substantial modification.

The "public" feed and the viewable options of feedback message sent to employees at the company is in some respects is not conventional because in implementation it makes the feedback messages open to other employees and the messages contain indicia such as a meeting tag and feedback form which the intended recipient of a feedback or coworkers can piece together the identity of the provider of feedback. This would be against the known work that has been done to assure anonymity.

The analytics system implements interactive tools that can be used by companies to determine and/or evaluate employee behavior. Known techniques or algorithms did not use or implement such technology and were inaccurate in their determination of such behavior. The system implements algorithms such as an evaluation of employee behavior that accurately determines the employee is behaving in a particular behavior such as a learning behavior. The system is configured to apply an algorithm to the feed of feedback messages (and data contained therein) and determine the behavior. Other types of categories of behavior can also be accurately determined form the application of algorithms to the date feed of rating (over a period of time) for a particular user. Known systems rely on subjective understanding of information or individual perceptions of information or activity. The data feed can provide a reliable and accurate assessment of employee behavior.

Implementations and embodiments of such systems, interactive tools, applications, or interfaces (etc.) in accordance with principles of the inventions are further described below.

The discussion includes additional relevant details depending on the embodiment and advantages and technical benefits are also described or understood from the explanation. The term cognitive development system is sometimes in recognition that the described system involving feedback is directed to electronic interactive systems involving feedback and cognitive skills development.

Embodiments of the invention are directed to systems and methods for developing cognitive skills of individuals. The contemplated system essentially includes a feedback application and a feedback processing application. The feedback application can be installed on a mobile device and used by an individual to submit feedback to his peers. The feedback application allows the individual to compose a feedback freely with his own words. The feedback application also includes several feeds in which feedbacks are displayed. The feedbacks are displayed anonymously in the feeds without showing the sender's identity. The feedbacks are sent or displayed in the feeds in real-time and in a chronological order. For example, when a user sends a feedback to a recipient, one of the feeds may show the recipient and the feedback he or she has received immediately after the sender clicks on the send button on the feedback application. The feedback processing application provides the data that is displayed in the feeds. The feedback processing application is installed on a server and is used to provide anonymous feedback to the feedback application or the feeds. The feedback application sends the feedback to the feedback processing application. The feedback processing application process the feedback to withhold information identifying the sender and provide the feedback without the sender's information to the recipient and one of the data feeds. The feedback application can also send requests to the feedback processing application to retrieve the data for other feeds. The feedback processing application includes a first database containing sender's information and a data cache and retrieval system that is devoid of sender's information or has sender's information encrypted (in general, it should be understood combination are contemplated). The first database is protected with security measures or security configuration so that no one (except authorized users) can access it to determine the identity of their feedback givers. The data cache and retrieval system may be implemented based on Solr technology to quickly store and retrieve data stored in the data cache and retrieval system. The system for developing cognitive skills of individuals may also include an analytics application that is used to analyze user's feedback giving and receiving behavior and evaluate their feedback empathy and authenticity and their learning behavior. The system for developing cognitive skills of individuals may further include an event moderating application. The event moderating application can be used in conjunction with the three applications to supplement their functionalities. The system for developing cognitive skills of individuals by employees of an organization to submit feedback to coworkers, to view feedback they have received, and to improve work culture.

Technical improvements over the prior art can for example include:
- A flexible tool allowing users to compose their own and true feedback without being restricted to certain terms or selections or being filtered or otherwise modified;
- Software applications and systems that can process and provide anonymous, original feedback to recipients in real-time;
- Safeguarding sender identity by implementing a database containing sender identifiers with application level and database level securities and/or implementing a system to store and access a database that is devoid of sender identifiers or that has sender identifiers encrypted;
- Increasing the speed of providing anonymous, original feedback sent to or stored on a server to the feedback application by implementing a Solr or similar system;
- Reducing or eliminating feedback abuse by providing a system that is separate from the organization's employee evaluation system for determining employee's promotion, raise, and/or bonus and that is used to obtain information for improving employee's learning behavior that is not use in determining employee's promotion, raise, and/or bonus;
- Reducing or eliminating feedback abuse by providing software applications and systems that can identify every user's feedback giving and receiving behavior, allow other individuals to up vote or down vote a feedback, and receive feedback judge's feedback for comparing with other users' feedback; and
- Analyzing employee's performance by evaluating the feedback he has given and received using his sender identifier but without compromising his feedback giving identity to others.

Other improvements of the invention will become apparent from consideration of the drawings and ensuing description. The contemplated systems and methods provide a truly anonymous feedback mechanism that can be used safely and effectively motivate improvements in teamwork and quality.

FIG. 1 illustrates one embodiment of the system 100 for developing cognitive skills of individuals. The system includes a feedback software application 105 installed on an electronic device 100 (feedback communicating system), a feedback processing software application 110 implemented on one or more servers (feedback processing system), an analytics software application 115 implemented on one or more servers (feedback analytics system), and an event moderating software application 120 implemented on one or more servers (event moderating system). The electronic device is preferably a mobile smartphone that is handheld and capable of downloading and installing mobile applications that can communicate through the mobile phone with server via mobile networks or other wireless networks. Each of the electronic device and servers is a computer system that includes a microprocessor and volatile and non-volatile memory, to configure the computer system. The computer system also includes a network connection interface that allows the computer system to communicate with another computer system over a network. The feedback processing software application 110, the analytics software application 115, and the event moderating software application 120 may be implemented on the same severs or different servers. The system may include one or more of the aforementioned software applications, instead of all three. Each software application may also be used independently or in conjunction with another software application (a software application other than the above three software applications) to strengthen or supplement functionalities of the other software application.

The feedback software application 105 includes a login interface and performs a user authentication process to allow the user to access the feedback software application. A user can enter his or her sign-in credentials from the login interface through the electronic device and the entered information is transmitted over a network to another computer system by the electronic device. The computer system receiving the user's credentials may be an authentication system 125 that may be part of the system 100. For first time users, the user's credentials may be generated by the authentication system 125. In some embodiments, first time users can also create their own credentials from the login interface. Upon receiving the credentials, the authentication system 125 checks if they match the credentials stored in the authentication system (stored as a result of the authentication system generating the credentials or first time users creating the credentials). If they match, the authentication system 125 generates an authorization or security token and sends it over the network to the electronic device 100. The feedback software application 105 incorporates the token into all of its data to or communications with the feedback processing software 110. The token is required to communicate with those software applications and is checked and verified by those software applications before the feedback software application 105 can access the functionalities and data in the feedback processing software 110. The authentication system 125 may generate a user identifier in response to the match and can transmit it over the network to the feedback software application 105. The user identifier may also be included all of the feedback software application 105's data or communications with other software applications. The user identifier may be a code or number that only the system or software applications knows as the identity of the user. For example, the user, another user, or a technician does not know the identity of the user when the code or number is presented to that individual. If the credentials do not match, the user (or electronic device) is prevented from accessing the feedback software application 105 and other software application and an invalid message is transmitted to the user.

Once access to the feedback software application 105 is granted, the feedback software application 105 provides a user interface that comprises a freestyle text area allowing the user to compose feedback message with their own words, a numerical feedback rating scale allowing the user to select a numerical feedback rating, and a send command allowing the user to send the composed feedback message and the selected feedback rating to another computer system over a network. The person who submitted the feedback (including the feedback message and rating) is referred to as a feedback giver. The user interface allows the user to select an individual, enter a feedback message for the selected individual via the freestyle text area, and select a numerical feedback rating for the selected individual from the numerical feedback rating scale. The user interface can also show a list of events (past, current, and future events) and display the participants in each event. The user can select an event and a participant in the event, enter a feedback message for the participant via the freestyle feedback text area, and select a numerical feedback rating for the participant from the numerical feedback rating scale. The feedback software application 105, and the system 100 as a whole, can be used by employees of an organization to provide feedback to peers. The feedback software application 105, and the system 100 as a whole, can also be used by others in other entities, institutions, or situations such as to customer-to-vendor communications, student-to-teacher communications, and other feedback senders and feedback recipients in various roles and contexts. The feedback software application 105 can be used to provide feedback (including the feedback message and rating) after an event, such as after the feedback recipient gives a presentation, and the feedback can be prepared for the feedback recipient's performance in the presentation. The events may be associated with meetings or other activities of the organization.

The freestyle text area is an area where the user can enter a message by typing on a QWERTY keyboard of the electronic device with his own words. The user may also enter such a message in other manners, such as by speaking to or using gestures to convey his own words to the electronic device. The message the user enters is what is transmitted to the feedback processing software application and is what is sent to the feedback recipient and the public feed (and other applicable feeds). The content of the message is not filtered or modified by the feedback software application, feedback processing software application, or other individuals. The user's ability to enter his desired words is not restricted or limited by the feedback software application (e.g., being forced selected only a certain options or predetermined messages), and the user can enter any words he wishes. The numerical feedback rating, for example, may be built a scale of 1-4 with 1 being below expectations, 2 being meets expectations, 3 being exceeds expectations, and 4 being greatly exceeds expectations. Other multi-level and types of rating scales are also contemplated. The selected individual or participant (the intended recipient of the feedback) is referred to as a feedback recipient. A command may be a button (physical or digital button), an icon, a tab, a window, or the like permitting users to activate a functionality of a software application or a computer system.

The user interface also includes a public feed allowing users to view feedback messages and an numerical feedback rating received by a feedback recipient (in a specific feedback by a feedback giver), and a vote command to up vote or down vote and a red flag command to flag each feedback message displayed on the public feed. The user interface further includes a received feed allowing only feedback recipient to view feedback messages and an average numerical feedback rating that feedback recipient has received and a sent feed allowing only feedback giver to view feedback messages and numerical feedback ratings that feedback giver has sent.

The feedback software application 105 is configured to generate a receiver identifier identifying the feedback recipient, and a message identifier identifying the composed feedback message, an event identifier identifying the selected event if an event is selected, and a time identifier (time information) identifying when the feedback is sent (e.g., date and time). These identifiers may be generated in response to the user selecting the send command (after the user selects a feedback recipient, completes a feedback message, and chooses a numerical feedback rating). In some embodiments, the feedback software application 105 may also generate a user identifier or sender identifier in response to the send command selection. For example, the authentication system 125 may be configured to generate only an authentication token when the user's credentials are verified (does not generate a user identifier) and the user identifier can be subsequently generated by the feedback software application 105 using the user's credentials when the user clicks on the send command. The user identifier or sender identifier identifies the feedback giver. The feedback software application 105 transmits the feedback (including the feedback message and rating) and the generated identifiers (including the user identifier whether it is generated by the authentication system 125 or the feedback software application 105) to another computer system (e.g., the servers on which the feedback processing software application 110 is implemented) over a network via the network connection interface of the electronic device 100 after the user selects the send command.

With respect to the feedback processing software application 110, the servers on which the feedback processing software application 110 are implemented are configured to receive the feedback and the generated identifiers over the network via the network connection interface of the servers. The feedback processing software application 110 also checks if an authorization token exists and verifies whether the token is valid. The feedback processing software application 110 includes two environments, an application environment 130 and a reporting environment 135. The received data and the token enter from the application environment 130.

In one embodiment, the application environment 130 includes a service (or service application) 140 that processes the received data, a first (primary) database 145 for storing the received data, a data cache and retrieval system 150 for storing a portion of the received data, and a second database 155 for storing a portion of the received data. Upon receiving the data, the service 140 stores the received data in the first database 145. The service 140 may store the entire received data in the first database 145, namely, the feedback and the generated identifiers. In other words, the service 140 stores what is received by the application environment 130 in the first database 145. In some embodiments, the service 140 stores at least the feedback (feedback message and rating), the user/sender identifier, and the receiver identifier in the first database. Other combinations are also contemplated. The data stored in the first database is raw data, meaning that the data received is the same as the data stored or that there is no additional procedure applied to remove, add, or modify (e.g., encrypt) any data in the received data other than those basic or inherent in the operations of the software application and the servers, such as decoding, analogue-to-digital conversion, etc.

The service 140 also duplicates the received data, removes or erases the user/sender identifier from the duplicated data, and stores the remaining data in the duplicated data (or the duplicated data without the identifier) in the data cache and retrieval system 150. The service 140 may duplicate the received data as the data is received or from the data in the first database 145. The data 150 in the data cache and retrieval system 150 is devoid of user/sender identifiers.

Additionally, the user/sender identifier in the first database 145 may be duplicated and stored in the second database 155. The second database 155 is not linked to the data cache & retrieval system 150). The database 155 and the system 150 are two separate, independent systems. The duplication can be achieved through an asynchronous job. The user/sender identifier in the second database 155 may be further encrypted. The time information in the first database 145 may be also duplicated, diluted, and stored in the second database 155. For example, the time information may show the exact date and time the feedback was sent, such as on May 2, 2018 at 2:00 pm. This information may be generalized or downgraded (e.g., to a lower resolution in time) such that the modified time information only indicates that the feedback was sent on May 2, 2018, in the first week of May in 2018, or in May 2018. The time information may be modified by eliminating the time portion (e.g., 2:00 pm) only, by eliminating the time portion and changing the date portion to a lower resolution (e.g., from May 2 to first week in May), or by changing the time portion to a lower resolution (e.g., from 2:00 pm to afternoon) and the date portion to a lower resolution. Higher resolution in time means that the time information is more specific whereas lower resolution in time means that the time information is less specific. Encryption and dilution are used to anonymize feedback giver's identity. Duplication, encryption, and dilution may be performed under instructions given by the service 140. The time information in the system 150 is saved in original time resolution.

For clarification, the processes performed by the service 140 refers to one or more of the aforementioned storing step (with respect to the first database 145), duplication step, removal step, and storing step (with respect to the data cache and retrieval system 150). They may further include the step of duplicating and storing the user/sender identifier in the second database 155.

The reporting environment 135 accesses the data in the data cache and retrieval system 150 to perform a sentiment analysis.

Alternative to removing the user/sender identifier from the raw data before saving to the data cache and retrieval system 150, the feedback processing software application 110 can be implemented with asymmetric encryption. In this embodiment, the application environment 130 is equipped with a public key configured to encrypt the user/sender identifier. The applicant environment 130 can encrypt the user/sender identifier of each feedback sent by the same person differently (e.g., with a different code), but know that the different codes are associated with the same user/sender identifier or person. For example, the applicant environment 130 can encrypt the user/sender identifier of feedback message A with XXXX and the user/sender identifier of feedback message B with YYYY when both feedback messages are sent by the same person. After encryption, the encrypted user/sender identifier and the other data (e.g., feedback message, rating, and other identifiers) are stored to the data cache and retrieval system 150. The reporting environment 135 accesses the data in the data cache and retrieval system 150 and uses it to perform a sentiment analysis. The reporting environment 135 is equipped with a private key to decrypt the encrypted user/sender identifier so it can perform a sentiment analysis to the user corresponding to that identifier or provide a sentiment analysis to that user. The encrypted user/sender identifier can only be decrypted using the private key.

Each environment and service may be referred to as a system or subsystem within the feedback processing software application.

In either embodiment (identifier removal embodiment or asymmetric encryption), the data in the first database 145 and the data cache and retrieval system 150 may be stored as tables. The received data can be transformed into different data structures such as tables by the service 140 before it is saved, or by the database 145 or the data cache and retrieval system 150 after the service 140 provides it the data. For example, the service 140 (or the first database 145/the data cache and retrieval system 150) can create tables by separating the feedback message, identifiers, and rating into at least two categories and stores each category as a table. The feedback message, user/sender identifier, receiver identifier, message identifier, and rating may be classified in one category and saved in one table, and the event identifier may be classified in a separate category and saved in another table. The two-table format is saved in the first database and the data cache and retrieval system. As discussed above, the user/sender identifier can be removed or encrypted before being saved to the data cache and retrieval system. As such, the two tables in the first database includes the user/sender identifier and the two tables in the data cache and retrieval system either is devoid of the user/sender identifier or has the user/sender identifier encrypted. The reporting environment 135 may access the data in the two-table format. The user/sender identifier in the second database 155 may be duplicated from the data in the two-table format in the first database 145.

The data cache and retrieval system 150 is used by the service 140 to retrieve the necessary data in response to a request sent by the feedback software application 105. The data cache and retrieval system 150 is used by the service 140 to keep feedback giver's identity anonymous since the sender's identifier is either unavailable or encrypted. Sender's identifier in the second database 155 is used or encrypted sender identifier is unencrypted only in limited circumstances by the reporting environment 135 when analytics (e.g., sentiment analysis) requires it.

The data cache and retrieval system 150 (or the retrieval system for simplicity) is a system that includes a cache mechanism, an index mechanism, and a database. The cache mechanism may be based on Redis or memcached technology and is used to cache the data in the retrieval system 150, in particular the data that has been previously found or retrieved. For example, when the service 140 queries a database in response to a request sent by the feedback software application 105 and the retrieval system 150 returns the results, the results are stored in the cache for a period of time so the results can be quickly accessed when they are called (e.g., can be retrieved in several milliseconds, instead of several seconds). The index mechanism search indexes the data in the retrieval system 150 and saves the indices in the index mechanism. The index mechanism enables quick searching for the data in the retrieval system 150. The data searched by the index mechanism may be either data that has not been searched before, or data that has been stored beyond the period of time allowed by the cache and is cleared from the cache. The index mechanism may be the default mechanism used by the retrieval system 150 to search data and the cache mechanism may be used by the retrieval system 150 if the data to be searched is already in the cache mechanism. As to the database, the cache mechanism and the index mechanism operate on the data in that database to retrieve the necessary data. For example, the index mechanism may inverse-index each feedback message and rating in that database. When a search is conducted, such as by the reporting environment 135 or the feedback software application 105 for the word ABC in the feedback messages stored in the retrieval system 150, the index format allows the environment 135 or software application 105 to quickly identify and retrieve those messages. Other techniques and platforms related to searching are contemplated.

The retrieval system 150 also includes two security measures or configurations to protect the identity of feedback giver. One security measure is that it is configured to operate in response to the user/sender identifier generated by the authentication system or the feedback software application. The user/sender identifier is used by the retrieval system 150 to find feedback messages and ratings stored in the retrieval system 150 that the feedback giver has given. That identifier only allows that particular user (through his feedback software application and the retrieval system) to look up the feedback he has given. The user (and the feedback software application and the retrieval system) cannot use it for other purposes, such as to look up feedback other people have given or identities of other feedback givers and their feedbacks. Another security measure is that the retrieval system 150 provides public key-private key cryptography or is configured to work with a system implemented with such cryptography. When a system is without asymmetric cryptography, the retrieval system 150 can provide such functionality and the system can operate as described above (the alternative embodiment). When a system already has this feature, the encrypted user/sender identifier is indexed by the retrieval system and used to anonymously and quickly find feedback (that is also indexed) the individual of that identifier has given.

The data cache and retrieval system 150 may be referred to as an enterprise search and index engine that is capable of retrieving information from many different databases, including the database in the system 150 and other databases. The system 150 provides quicker and more responsive capabilities in the context of the cognitive skill development system or feedback system. For example, the user interface of the system simplifies the feedback information to be saved and the system 150 can quickly index, save, search, and retrieve data because of the simplified structure. In systems other than feedback systems or feedback systems that do not provide a simple user interface, the amount of information received, e.g., from a Word or PDF document, may be significant such that using system 150 may not be as quick and efficient in indexing, saving, searching, and/r retrieving data. The data cache and retrieval system 150, for example, may be based on Apache Solr or a similar platform. Note in general that an alternative also contemplates combinations based on the alternatives.

The first database 145 storing the raw data or all the received data (including the user/sender identifier) is built with security measures or configuration to prevent unauthorized access. The first database 145 may be implemented in another private network and sit behind a firewall that are different from the private network and firewall in which the feedback processing software application (excluding the first database 145) is implemented. For example, accessing the first database 145 may require a different login process or credentials from those of the feedback software application (a separate portal). The first database 145 may be known as a production database server. The security measures or configuration can be implemented in two levels, application level and database level.

In one embodiment, the first database 145 is highly restricted such that only a certain software and service application can access the first database 145 (application level). The first database 145 is also highly restricted such that only a certain individuals who have complete access to the first database 145 or who have at least the access to the user/sender identifiers in the first database 145 (database level). On the application level, the first datable 145 may grant permission to the feedback software application 105 and the service application 140 (and only those applications) allowing them to write into and read from the first database 145. The feedback software application 105 and the service application 140 may be configured such that they write data into the first database 145 and read data from the data cache and retrieval system 150. On the database level, only the first database creator and individuals approved by the first database creator have access. The creator and authorized applications and people can view or retrieve the raw data, including the user/sender identifier and the actual feedback, from the first database 145. The raw data is not encrypted. The creator and allowed individuals access the first database 145 through a two-step security process. First, they are required to log into the private network on which the first database is situated that is different from the private network on which the feedback processing software application (excluding the first database) is situated. Second, their credentials are checked by the first database 145 whether they have permission to access the data in the first database 145 if they want to access that data. In some embodiments, the second step may involve submitting another login credential that is different from the first step. Both are privilege access and require permission from the creator. Only individuals who pass both steps can access or view the raw data in the first database 145. Some individuals may be granted with only the first privilege access so that those individuals can modify or update the hardware and software of the first database 145 or work on the first database 145 for other purposes such as testing and network related issues. Those individuals, however, do not have access to the raw data in the first database 145.

A database management software application 160 is implemented to interact with the first database 145. The database management software application 160 may be accessible only by the first database creator. The database management software application 160 provides a user interface allowing the first database creator to grant first database access permission to software applications (e.g., feedback and service applications 105, 140) and individuals (e.g. users who are granted with the first privilege access and users who are granted with the second privilege access). Users who are granted with the second privilege access means users who are granted with the first and second privilege access.

A user access log system 165 (or software application) is also implemented to interact with the first database 145. The log system 165 may be part of the first database 145 or the feedback processing software application 110. The log system 165 is configured to record every authorized user's access to the first database 145, including the first database creator's activities. The log system 165 can record activities happened under the first privilege access and the second privilege access. For example, activities occurred under the first privilege access may include the identity of the authorized user, the hardware, software, data, and network he modified, the date and time of his actions, and other information. Activities occurred under the second privilege access may include the identity of the authorized user, the raw data he accessed, such as user/sender identifiers and actual feedbacks, the date and time of his actions, and other information. The log system 165 is configured by the first database creator or other professionals (e.g., technicians, engineers, network administrators, IT specialists, etc.) to be accessible by a limited number of users so that they can check if anyone (including the creator) has accessed the data in the first database 145. Since the cognitive skill development system is configured to keep feedback giver's identify anonymous, the log system 165 is designed to check if there is any human access to the data in the first database 145 that may compromise feedback giver's identity of a feedback, when authorized individuals are not supposed access this information.

Another embodiment of the security measures or configuration for the first database 145 can also be implemented. The second embodiment is also implemented in the application level and the database level. On the application level, it involves two entities, software application and service application and application administrators. Software application and service application (or one of the applications) are provided with a security key or hash that enables them to encrypt a feedback and to access the first database 145 (e.g., storing the encrypted feedback in the first database and retrieving the encrypted feedback from the first database). The same security key may also allow software application and service application to decrypt retrieved feedback, or software application and service application may be provided with a second key to decrypt the data (such that the actual message and rating and the user/sender identifier can be seen or be otherwise available). Application administrators, e.g. professionals who manage or control the feedback software application and service application, may also have the decryption key and may be the only individuals who have such a key. The first database 145 and database administrators (described below) do not have the decryption key and are unable to decipher the encryption.

On the database level, it also involves two entities, the first database and database administrators. The first database 145 is equipped with a security mechanism that can check whether a user trying to access the first database 145 has the necessary security key (the first database 145 itself may also have such a key). Database administrators, e.g. professionals who manage or control the first database 145, may be the only individuals who are provided with such a key. The security key for the first database is different from the encryption/decryption key in the application level. The software application and service application and application administrators (described above) do not have the security key for the first database 145 and are unable to access the first database 145.

Based on the above, accessing and decrypting the feedback in the first database 145 such that the actual message, rating and user/sender identifier can be seen or be otherwise available requires both the decryption key and the first database's security key. Both keys may be generated and provided to their respective administrators at the onset when the second embodiment of security measures or configuration is installed. A platform may be implemented with the second embodiment that allows the administrators to submit their keys. The administrators can access the data in the first database 145 and decrypt the data in the first database 145 from the platform. To further strengthen the security level of the second embodiment, application administrators and database administrators may be limited to individuals who hold the most senior positions (in terms of ranking) or executive-level positions in the organization, or those who can make executive decisions on behalf of the organization (e.g., Chief Executive Officer, Chief Financial Officer, and Chief Technology Officer). For example, the application administrator may be the CTO and be provided with the decryption key, whereas as the database administrator may be the CEO and be provided with the security key to the first database. Therefore, it requires both the CTO and CEO to submit their respective keys into the platform in order to access and decrypt the data in the first database (in order to see the actual feedbacks and identities of the feedback givers). As such, the first database creator may not have either key and is unable to access or decrypt the data in the first database 145 even though he designs and installs the first database and its technology (e.g., its security measures or configuration).

The second embodiment may be referred to as a foolproof security model with distributed security access (e.g., between application administrators and database administrators). Security measures or configuration based on the combination of the above two embodiments are also contemplated. Security measures or configuration based on the combination of one or more features in the first embodiment and one or more features in the second embodiment is also contemplated.

The feedback software application 105 and the analytics software application 115 may not be able to access the first database 145. Both applications may be directed to the data cache and retrieval system 150 to obtain the necessary data.

Implementing the service, databases, data cache and retrieval system, and security measures discussed above allow the cognitive development system to maintain feedback giver's identify anonymous while still being able to perform analytics on feedback giver by using feedback giver's identity in a limited, unexposed manner (without compromising feedback giver's identity). Embodiments of the invention ensure the highest level of access restriction and data protection, in particular to information identifying the feedback sender. The first database and related applications and systems built with the above features improve the operations or security operation of the first database. They may also improve the storing and organization of the received information in the feedback processing software application in some embodiments.

Figure 3:
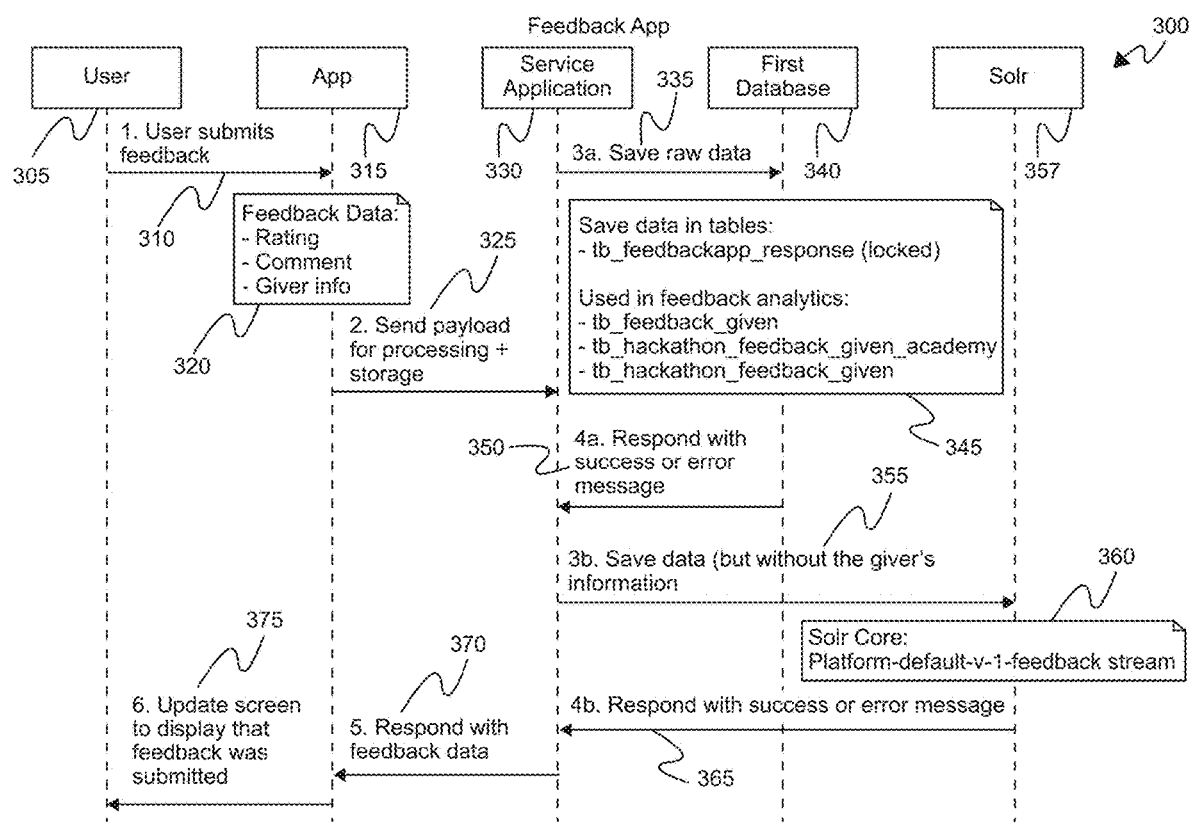
FIG. 3 illustrates a flow process showing a communication between the feedback software application and the feedback processing software application in accordance with some embodiments of the invention.

FIG. 3 illustrates a flow process 300 showing a communication between the feedback software application and the feedback processing software application. In particular, FIG. 3 shows how a submitted feedback is saved in the application environment of the feedback processing software application and how the submitted feedback is provided to the feedback software application. A user 305 enters a feedback 310 (including feedback message and rating) from the user interface of the feedback software application 315. In response to the user selecting the send command, the feedback software application sends a request or a request payload 325 containing the feedback and the user/sender identifier (collectively referred to as feedback data 320) to the service application 330 of the application environment. The service application 330 then may save the feedback data 320 or raw data in the first database 340 (step 335) in the two-table format described above or the format shown in 345. The first database 340 then responds with either a success or error message (step 350) to the service application 330 indicating whether the raw data is successfully or unsuccessfully saved, respectfully. The service application 330 may also duplicate the same data in the two-table format or the format shown in 345, remove the user/sender identifier from the duplicated data, and save the duplicated data without the user/sender identifier in the data cache and retrieval system 360 (step 355). The duplicated data without the user/sender identifier may be saved in the format shown in 360. The data cache and retrieval system 360 then responds with either a success or error message (step 365) to the service application 330 indicating whether the duplicated data without the user/sender identifier is successfully or unsuccessfully saved, respectfully. Once the data without the identifier is successfully saved, the service application 330 provides that data, which is the data the user selected to send but without the user/sender identifier, to the feedback software application (step 370). For example, the service application 330 may provide the data to the public teed and the public feed may be updated to display the feedback the user submitted in step 310 without showing who submitted the feedback (step 375). The public feed shows the feedback recipient for which the feedback is intended and the feedback he or she has received. The public feed is updated to show the latest feedback (and the previous feedback), e.g., the feedback submitted in step 310, that the feedback recipient has received. In some embodiments, the system is configured to use HTTP GET and HTTP messages to send and receive feedback messages from the server.

The feedback processing software application (e.g., the service application) is configured to identify the feedback recipient using the recipient identifier, average numerical feedback ratings of the feedback recipient has received, and provide the feedback message and average numerical feedback rating for the feedback recipient to the public feed. The recipient identifier may correspond to an individual or a participant in an event selected from the feedback application software. The service application may access the feedback message and the ratings saved in the data cache and retrieval system to provide the feedback message and the average rating to the public feed. The service application may also provide the feedback message and the average rating to the public teed in response to saving the feedback message and rating in the data cache and retrieval system. For example, upon saving the feedback in the first database and the retrieval system, the service application uses the recipient identifier from that feedback saved in the retrieval system to determine the feedback receiver, to average numerical feedback ratings (rating from that feedback and ratings submitted by other feedback givers whose feedback is also saved to the first database and the retrieval system in the same way) received by the feedback recipient, and provide the message of that feedback and the average numerical feedback rating for the feedback recipient to the public feed. The public feed allows all users (e.g., the feedback recipient, the feedback giver, and other members in the organization) to view feedback messages and the average numerical feedback rating the feedback recipient has received. Since the information in the public feed is based on the data in the retrieval system, which either is devoid of user/sender identifiers or has user/sender identifiers encrypted, the identity of the feedback giver of each feedback messages is kept anonymously, e.g., is not shown in the public feed.

The received feed and the sent feed are also updated in response to the public feed update. The received feed, sent feed, and public feed may also update independently or simultaneously.

The feedback processing software application (e.g., the service application) also provides feedback messages and an average numerical feedback rating to the received feed. The service application may provide such messages and rating in similar manners discussed above that are related to a user sending a feedback and displaying that feedback in the public feed. Instead of a user submitting a feedback in step 310, step 310 may be the user selecting a command associated with the received feed to see the messages and rating he or she has received. Selecting the command generates a request that is sent to the service application 330 (step 325). The service application 330 then determines the recipient identifier corresponding to that user, retrieve feedback messages and rating using the determined recipient identifier from the retrieval system, and provide the retrieved feedback message and averaged rating to the received feed. In particular, the service application only provides the retrieved feedback message and averaged rating to the received feed of the user or requester. Since the information in the received feed is based on the data in the retrieval system, which either is devoid of user/sender identifiers or has user/sender identifiers encrypted, the identity of the feedback giver of each feedback messages is kept anonymously, e.g., is not shown in the received feed.

The feedback processing software application (e.g., the service application) also provides feedback messages and numerical feedback ratings to the sent feed. The service application may provide such messages and rating in similar manners discussed above that are related to a user sending a feedback and displaying that feedback in the public feed (or that are related to a user selecting the command associated with the received feed and displaying feedback messages in the directed received feed). Instead of a user submitting a feedback in step 310, step 310 may be the user selecting a command associated with the sent feed to see the messages and ratings he or she has sent. Selecting the command generates a request that is sent to the service application 330 (step 325). The service application 330 then uses the user/sender identifier to retrieve feedback messages and ratings from the retrieval system and provide the retrieved feedback messages and ratings to the sent feed. In particular, the service application only provides the retrieved feedback messages and ratings to the sent feed of the user or requester. In one embodiment, the user/sender identifier used by the service application is one that is encrypted by HMAC technology. The HMAC-encrypted user/sender identifier cannot be decrypted by the feedback processing software application, technicians, engineers, network administrators, or IT specialists and is used in the application environment only. Only the application environment knows the identity of the feedback giver associated with the HMAC-encrypted user/sender identifier. The HMAC-encrypted user/sender identifier is not used in the reporting environment since it cannot be decrypted.

Since the feedback message to be provided and the numerical feedback ratings to be averaged (whether it is for the public feed, received feed, or sent feed) are retrieved from the retrieval system that is without sender identifiers or has sender identifiers encrypted, the feedback message and the average numerical feedback rating are processed anonymously and provided to (e.g., displayed on) the feed anonymously with respect to feedback giver's identity.

In the public feed, the received feed, and the sent feed, the displayed feedback messages are shown in a chronological order (in the order in which they are received). The displayed feedback messages and the average rating or the plurality of ratings can be categorized based on event, such as the messages and average rating the user has received in the first event, the messages and ratings the user has received in the second event, etc.

The feedback processing software application is configured to operate in real-time. The feedback message, average rating, and plurality of ratings are provided to the public feed, the received feed, and sent feed as they are sent or requested (e.g., by clicking on the corresponding command). Users can see messages and rating in the respective feed produced or updated instantaneously (e.g., without appreciable delay perceived by user) after a command is selected or a request is sent. The average rating is updated as rating is received and the provided average rating always reflects the most up-to-date average. The rating is also averaged and provided in real-time. The public feed may be constantly updated to show feedback others have given even if the user has not sent a feedback. These messages can be retrieved and shown by clicking a command associated with the public feed. The received feed and sent feed also operate similarly. The feedback processing software application performs in similar manners described above to provide those data.

Figure 4:
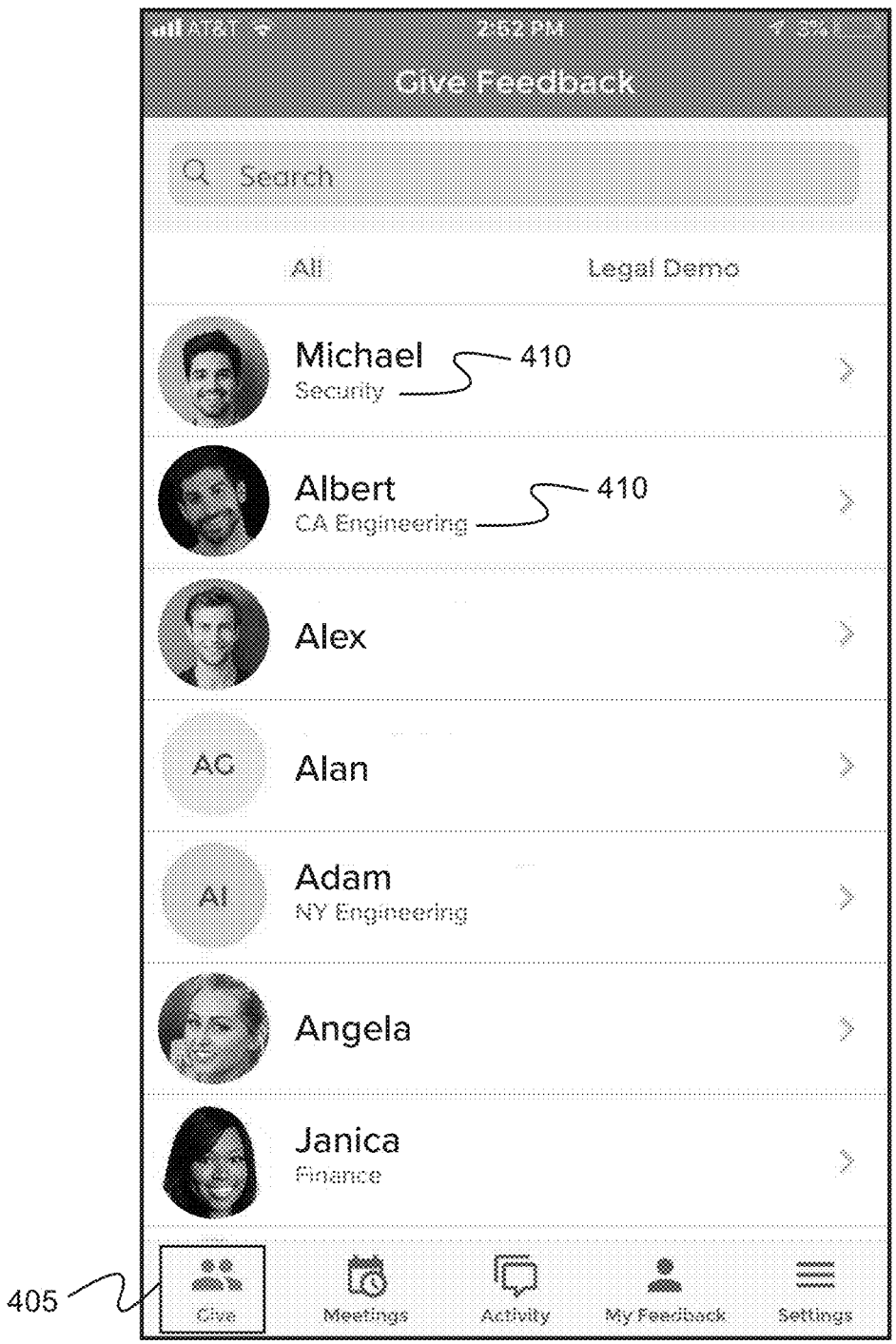
FIG. 4 illustrates part of the user interface of the feedback software application that allows the user to select a feedback recipient from an organization in accordance with some embodiments of the invention.

FIG. 4 illustrates part of the user interface of the feedback software application that allows the user to select a feedback recipient from an organization. This screen may be displayed in response to the user selecting the give command 405. The listed individuals may be employees of a company (the same company). Their location, office, or department 410 may be shown on the screen.

Figure 5:
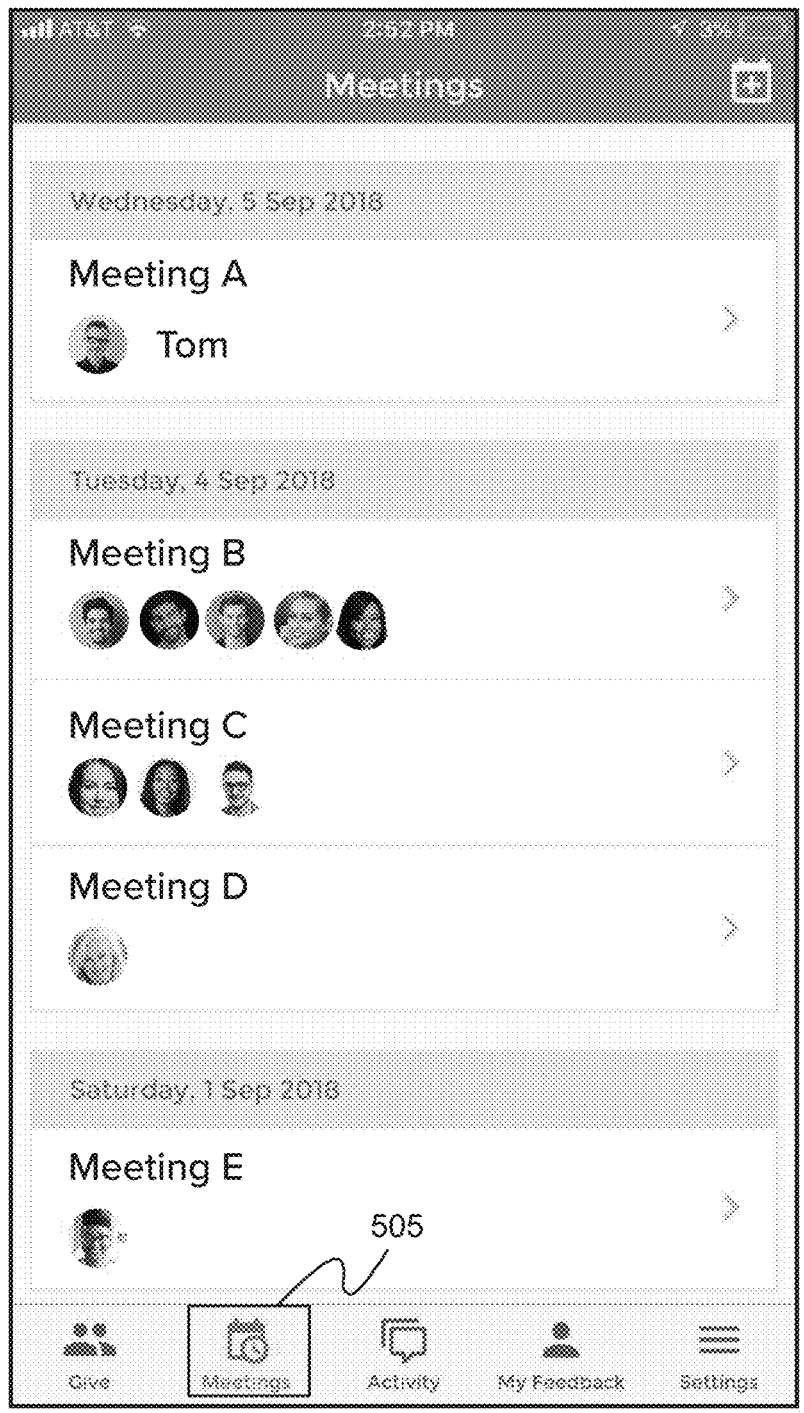
FIG. 5 illustrates part of the user interface of the feedback software application that allows the user to select a feedback recipient in an event hosted by an organization in accordance with some embodiments of the invention.

FIG. 5 illustrates part of the user interface of the feedback software application that allows the user to select a feedback recipient in an event hosted by an organization. This screen may be displayed in response to the user selecting the meetings command 505. This portion of the user interface may show the meeting on each day in the near future. For example, the screen may show that there is a future meeting A to be conducted by Tom on Wednesday, Sep. 5, 2018. Torn may be giving a presentation to audience in meeting A on that date.

Figure 6:
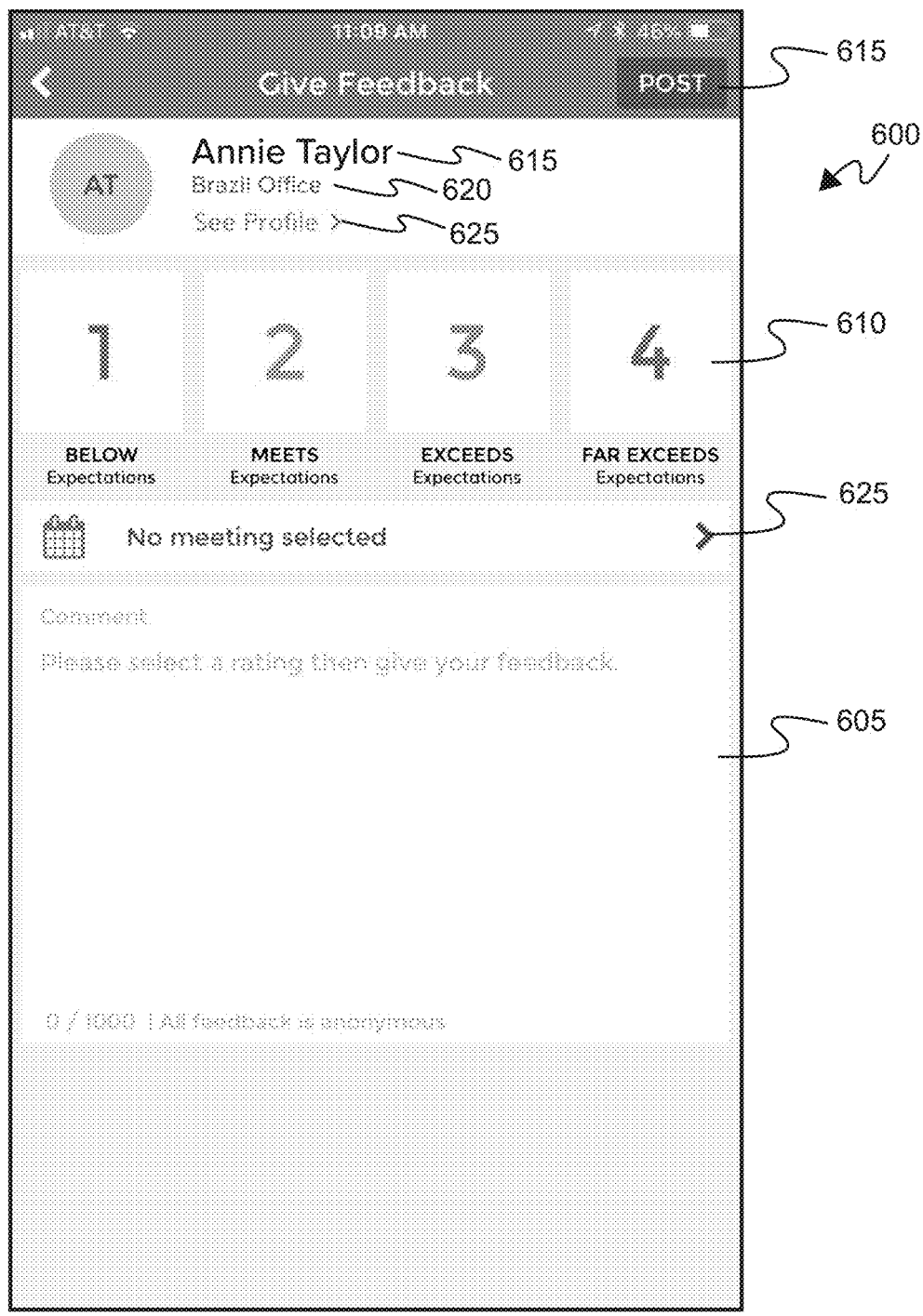
FIG. 6 illustrates part of the user interface of the feedback software application that allows the user to create and send a feedback in accordance with some embodiments of the invention.

FIG. 6 illustrates part of the user interface of the feedback software application that allows the user to create and send a feedback. The feedback creation area 600 includes a freestyle message composing area 605, a multi-level rating scale 610, and a send command 615. The feedback creation area 600 also shows the feedback recipient Annie Tayler 615, the office in which she is located 620, a profile command 625 for Annie. The feedback creation 600 further includes a meeting command 625 allowing the user to select the meeting in which the feedback recipient participates. The feedback creation area 600 may be displayed in response to the user selecting that individual from the screen shown in FIG. 4 or FIG. 5. When the individual is selected from the screen in FIG. 5, the meeting command 625 may be populated with the corresponding meeting in FIG. 5. See profile.

Figure 7:
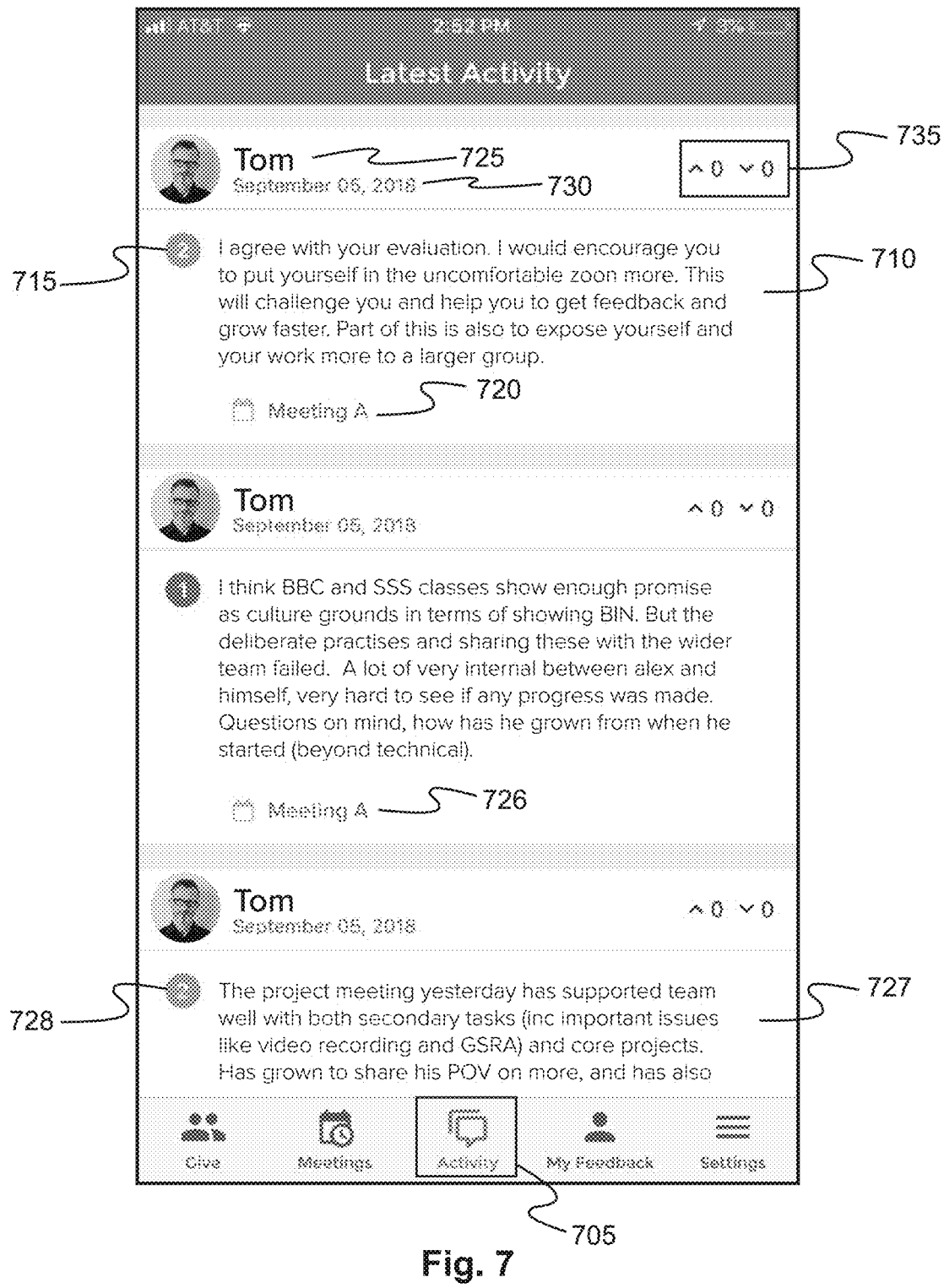
FIG. 7 illustrates one embodiment of the public feed of the feedback software application in accordance with some embodiments of the invention.

FIG. 7 illustrates one embodiment of the public feed of the feedback software application. This screen may be displayed in response to the user selecting the activity command 705. After the Tom gives the presentation and receives feedback from audience, the feedback Tom received, such as message 710 and rating 715, is shown in the screen. The feedback giver of each received feedback is kept anonymous (not shown). The public feed also shows the meeting 720 associated with the feedback and the feedback recipient 725. The date 730 on which the feedback is given or received is also displayed. The public feed also provides a vote command 735 allowing other users (other than the feedback giver) to up vote or down vote the feedback and showing the number of up vote and down vote the feedback has received. Although FIG. 7 illustrates only one feedback recipient, it is understood that FIG. 7 can also show other feedback recipients and their feedback. For example, 726 may be Henry and 727 and 728 may be his feedback message and rating, respectively. Henry 726 is shown below Tom 725 because Henry has given a presentation before Tom did, or because the feedback given to Henry is received before the feedback given to Tom.

Figure 8:
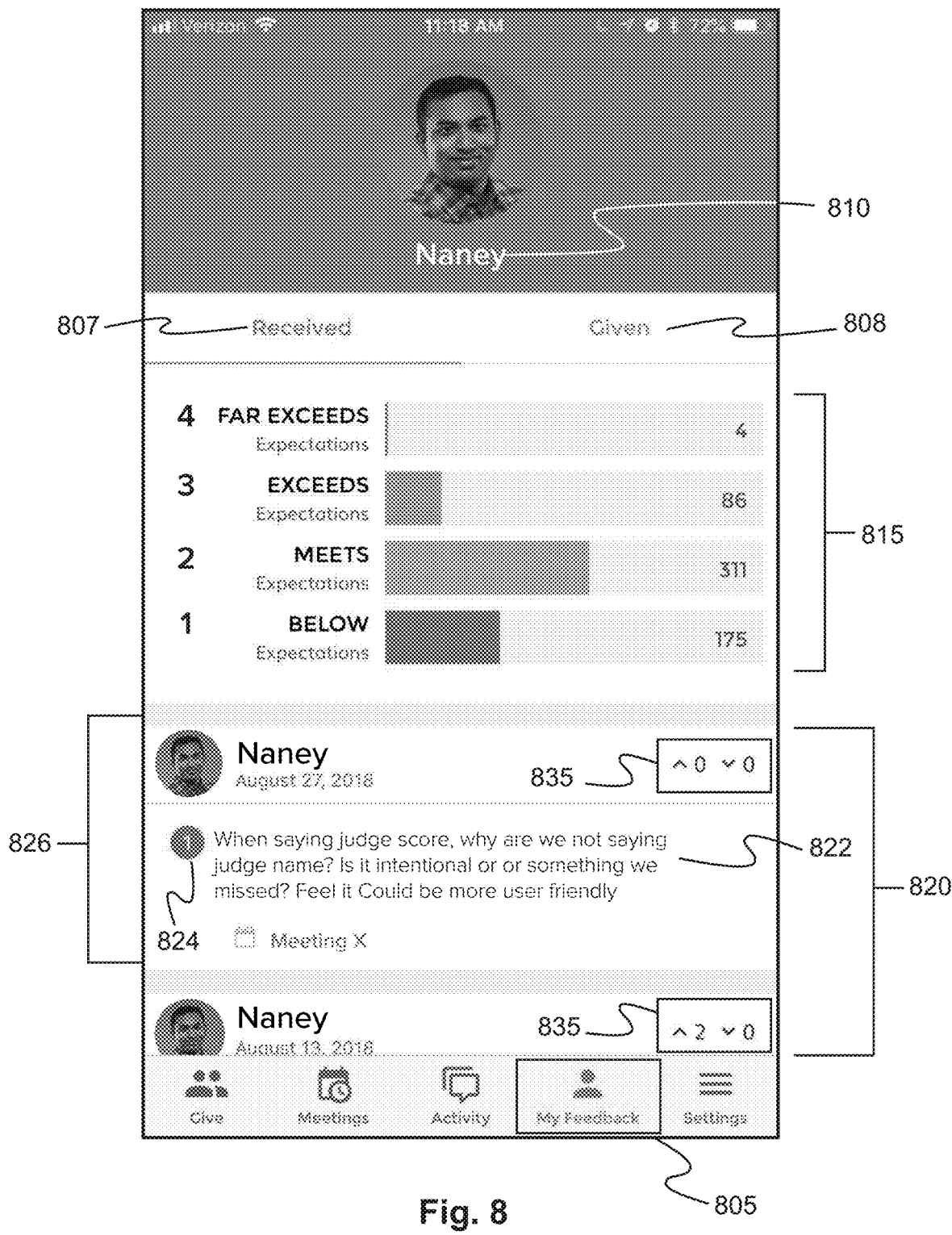
FIG. 8 illustrates one embodiment of the received feed of the feedback software application in accordance with some embodiments of the invention.

FIG. 8 illustrates one embodiment of the received feed of the feedback software application. This screen may be displayed in response to the user selecting the my feedback command 805 and then the received command 807. The received feed shows the user Nancy 810, the ratings she has received and the number of each rating she has received 815, and a detail view 820 of the feedback she has received. The detail view 820 shows the feedback message 822 and rating 824 of each feedback 826. The date 825 on which the feedback 826 is received, the associated meeting 830, and the number of up vote and down vote 835 received are also displayed. The feedback giver of each received message 826 (and rating) is kept anonymous (not shown).

Figure 9:
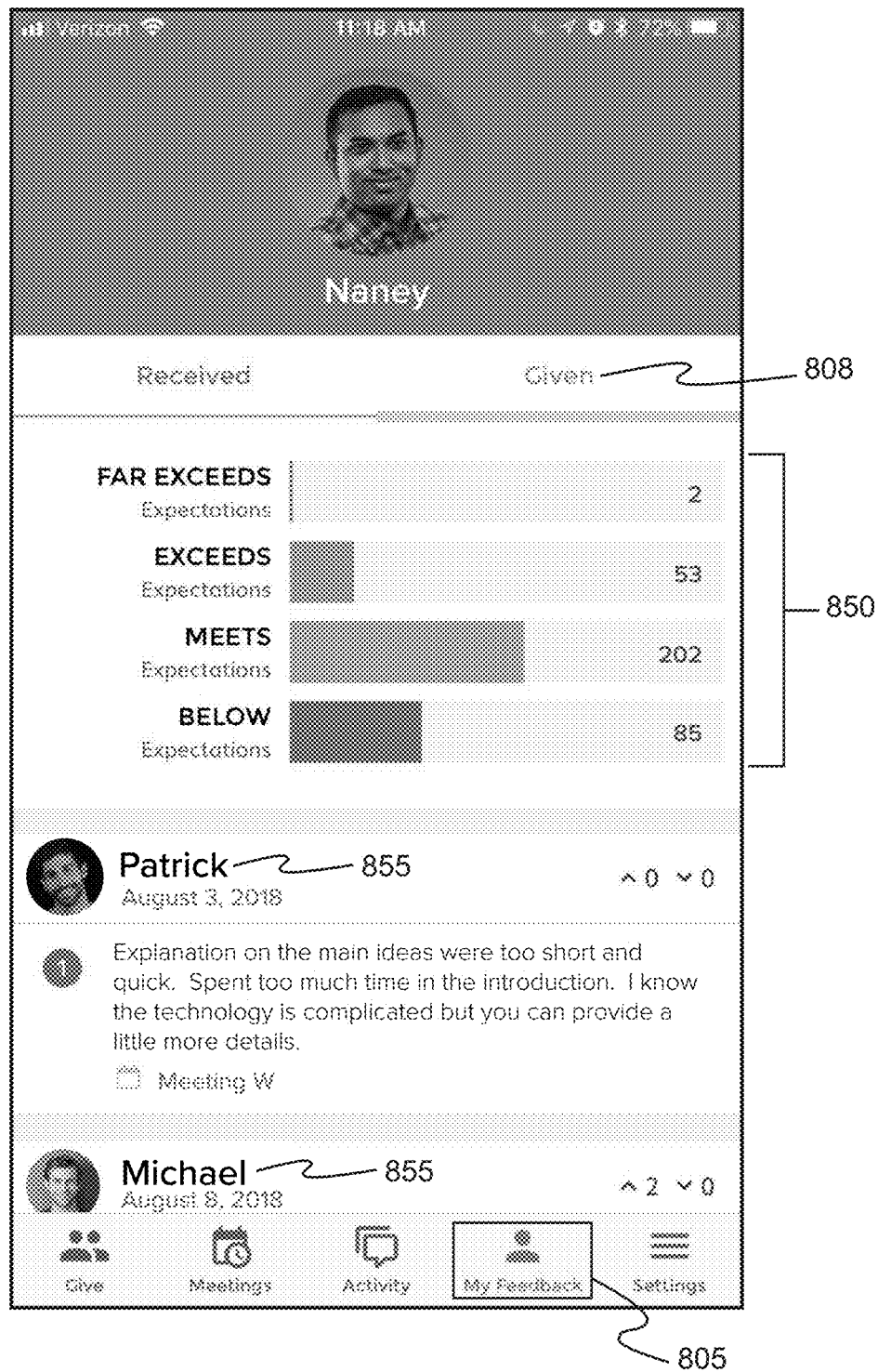
FIG. 9 illustrates one embodiment of the sent feed of the feedback software application in accordance with some embodiments of the invention.

FIG. 9 illustrates one embodiment of the sent feed of the feedback software application. This screen may be displayed in response to the user selecting the my feedback command 805 and then the given command 808. The sent feed provides information similar to that of the received feed shown in FIG. 8, except that the sent feed shows the ratings and the number of ratings 850 Nancy has given to other individuals, and the individuals 855 to whom Nancy has given feedback.

Figure 10:
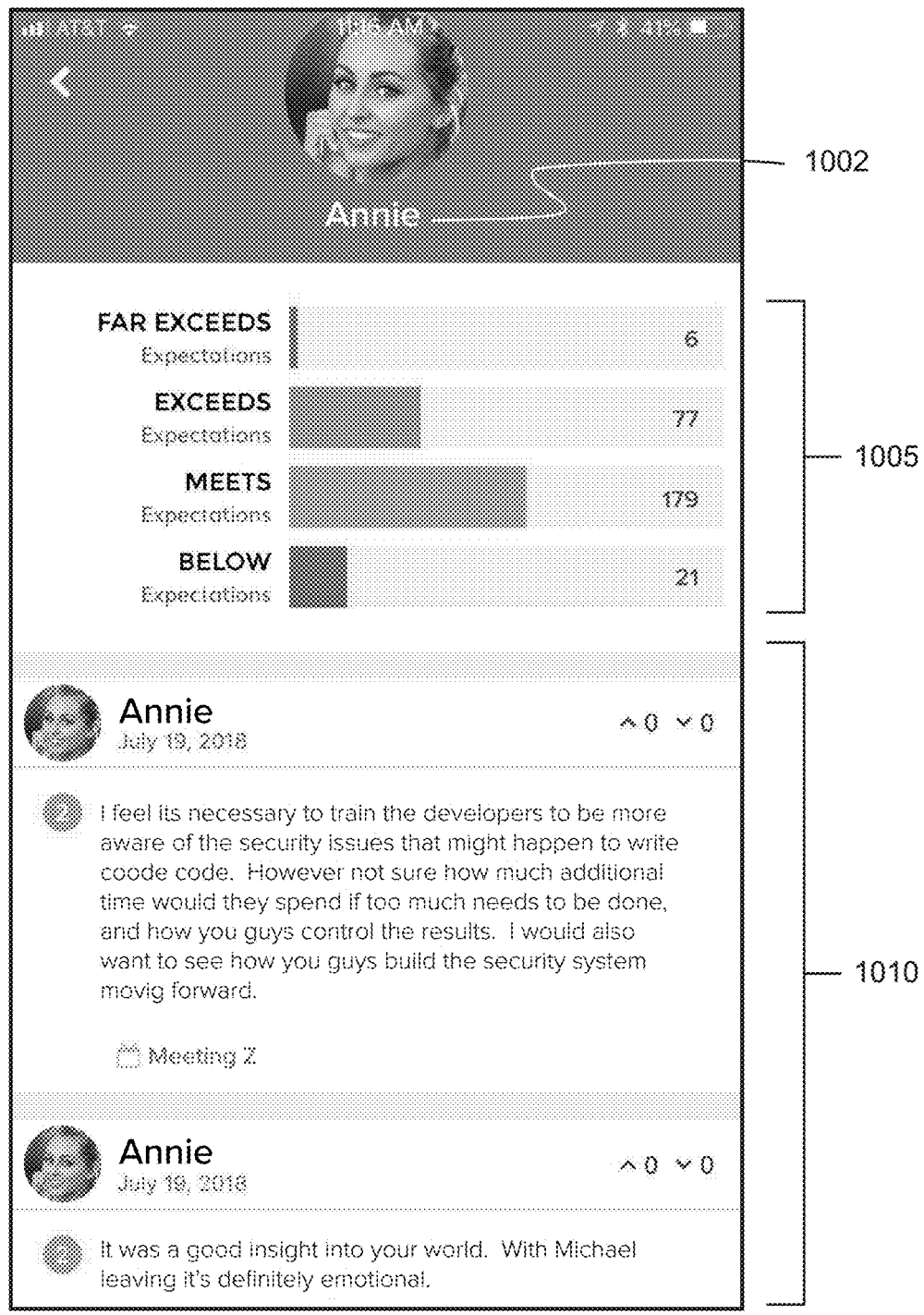
FIG. 10 illustrates one embodiment of the public received feed or the user profile of the feedback software application in accordance with some embodiments of the invention.

FIG. 10 illustrates one embodiment of the public received feed of the feedback software application. This screen may be displayed in response to the user selecting the profile command 625 shown in FIG. 6. In some embodiments, the profile may also be accessible from the screen shown in FIG. 4, 5, 7 or other screens by selecting that individual's icon or other commands. The profile may show the ratings the user Annie has received and the number of each rating she has received 1005, the feedback 1010 she has received, and other information. This received feed or profile is public, meaning that other people in the organization can also view the feedback and ratings the user 1002 has received and that access is not limited to only the user 1002.

With respect to the analytics software application 115, the analytics software application 115 may be implemented to interact with the reporting environment 135. The analytics software application 115 may also be implemented on the reporting environment 135 such that the analytics software application 115 and the reporting environment 135 reside on the same servers. Like the feedback software application 105, the analytics software application 115 may also include a login interface and performs a user authentication process to allow the user to access the analytics software application. The user may be network administrators, software engineers or technicians, IT specialists, or other individuals. Users who have access to the feedback software application may not have access to the analytics software application. The authentication process may be similar to the one discussed in the description of the feedback software application 105.

The analytics software application 115 is configured to evaluate individuals feedback giving behavior (which may be feedback message giving behavior, numerical feedback rating giving behavior, or both). The analytics software application 115 can determine the identity of the feedback giver, the feedback messages he has sent, the numerical feedback ratings he has sent, and the feedback recipients of those feedback messages and numerical feedback ratings. Using these information, the analytics software application 115 can evaluate the user's feedback giving behavior. The analytics software application 115 uses the data in the system 150, and the data in the second database 155 in some embodiments, to make such determinations and evaluations. The identity of the individual for whom the evaluation is conducted can be found by decrypting the user/sender identifier in the system 150 or second database 155.

In the evaluation, the analytics software application 115 examines the user's given feedback messages and numerical feedback ratings, determines certain patterns observed in the given feedback messages and numerical feedback ratings, and communicates a visual indicator based on the determined patterns to the user. In determining patterns, the analytics software application 115 may parse the feedback messages based on a large set of words and synonyms, determine the numerical feedback ratings the user has given, calculate the frequency of the user giving feedback messages and a certain numerical feedback rating (e.g., low numerical feedback rating, high numerical feedback rating, or both), determine whether the given feedback message or rating has received a vote up or down (and/or red flag in some embodiments), and generate a multifactor metric that represents a feedback giving empathy of the user and authenticity of the user or his messages using the parsed messages, determined numerical feedback ratings, calculated frequency, and/or determined vote up or down. As to the user's empathy, the metric may indicate that the user is likely overconfident e.g., because the user gives a lot low ratings and/or critics) or that the user is likely people pleasers (e.g., because the user gives a lot high ratings and/or compliments). As to the user's authenticity, the metric may indicate that the user's feedback is likely authentic (e.g., because the user's feedback received a lot up votes) or that the user's feedback is likely unauthentic (e.g., because the user's feedback received a lot down votes), The metric may indicate that the user is silent when the user does not give any feedback or does not give enough feedback (e.g., below a threshold).

The evaluation may be an overall analysis (considering all the messages and numerical ratings), feedback recipient-specific, or event-specific. This evaluation step may refer to the sentiment analysis mentioned above. The analytics software application includes computer algorithms and artificial intelligence that are programmed to perform above operations. The generated information that represents a feedback giving empathy of the user and authenticity of the user or his messages can be presented in the form of a report.

The analytics software application is also configured to identify a user's learning behavior using that user's received feedback messages and numerical ratings. The learning behavior identification process is similar to the process of evaluating individuals feedback giving behavior, except that this process is based on the feedback messages and the numerical ratings that the user has received. The analytics software application can determine the identity of the feedback recipient (which is the user for whom the learning behavior the analytics software application wants to identify), the feedback messages he has received, and the numerical feedback ratings he has received. Using these information, the analytics software application 115 can evaluate the user's learning behavior. The analytics software application 115 uses the data in the system 150 to make such determinations and evaluations. In some embodiments, the learning behavior identification process can also consider the user's given feedback. The analytics software application 115 uses the data in the system 150 so that the identities of the feedback givers are kept anonymous. In some embodiments, however, the analytics software application 115 can further consider the data in the second database 155 if necessary.

In the learning behavior identifying step, the analytics software application 115 examines the user's received feedback messages and numerical feedback ratings, determines certain patterns observed in the received feedback messages and numerical feedback ratings, and communicates a visual indicator based on the determined patterns to the user. In determining patterns, the analytics software application may parse the feedback messages based on a large set of words and synonyms, determine the numerical feedback ratings the user has received, calculate the frequency of the user receiving feedback messages and a certain numerical feedback rating (e.g., low numerical feedback rating, high numerical feedback rating, or both), and generate a metric to identify the user's learning behavior. For example, the metric may show that the user's learning behavior is "Trending Up," "Trending Down," "Risk Taker," "Flat," or "Hiding." The analytics software application 115 may identify the user's learning behavior as "Trending Up" when the user has been receiving positive feedback messages and/or higher numerical feedback ratings. The analytics software application may identify the user's learning behavior as "Trending Down" when the user has been receiving negative or suboptimal feedback messages and/or numerical feedback ratings. The analytics software application may identify the user as "Risk Taker" when the user's learning behavior shows both "Trending Up" and "Trending Down." Any of the three metrics indicates that the user is learning or involved in the events of the organization.

The analytics software application may identify the user's learning behavior as "Flat" when the user has been receiving the same or similar feedback messages and/or numerical feedback ratings. The analytics software application may identify the user as "Hiding" when the user has not been receiving feedback messages and/or numerical feedback ratings. Either metric indicates that the user is not learning or not involved in the events of the organization. The analytics software application may compare received feedback in two different periods of time to determine the appropriate metric.

Figure 11:
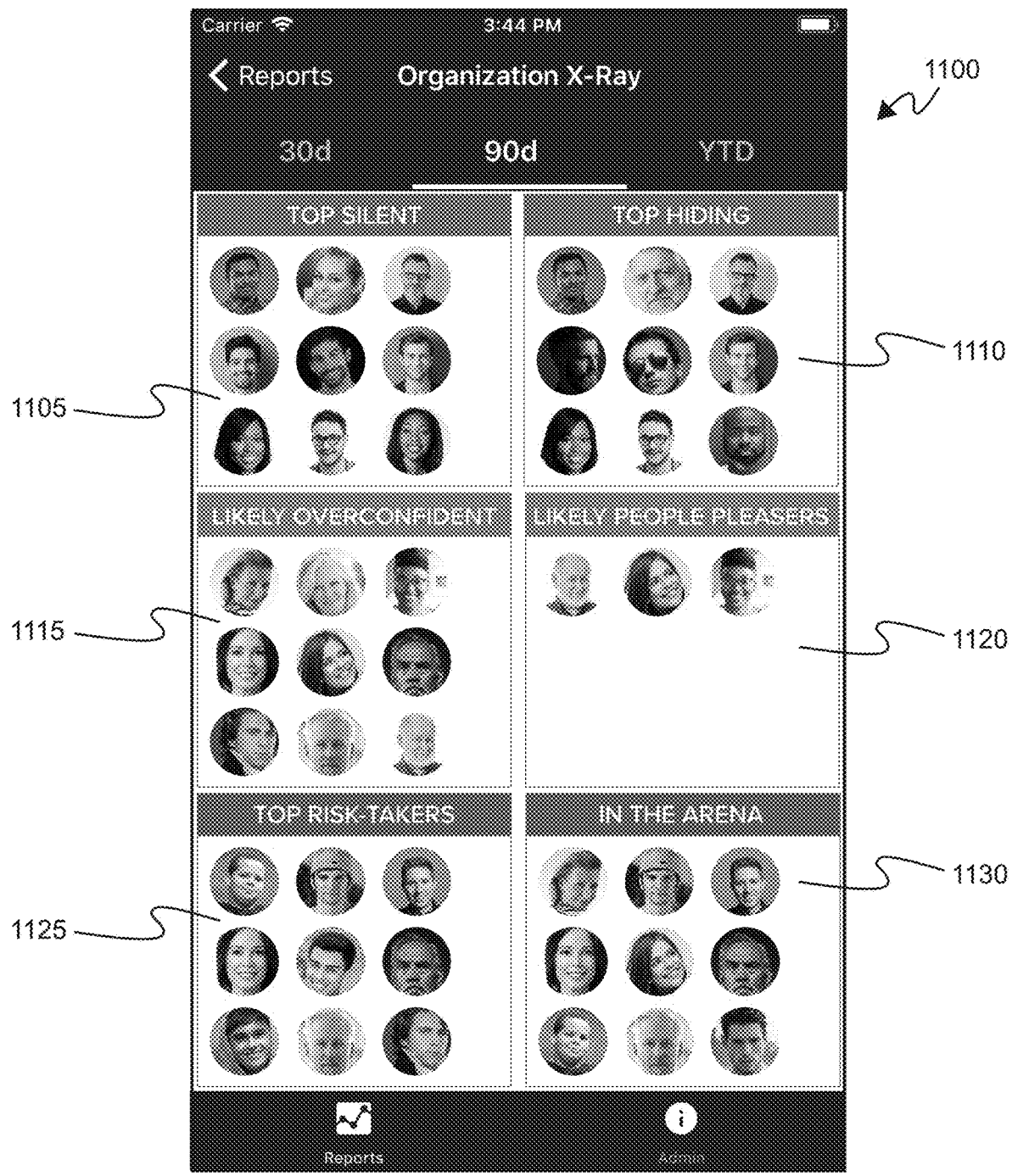
FIG. 11 illustrates one embodiment of the visual indicator presented by the analytics software application in accordance with some embodiments of the invention.

The analytics software application 115 can communicate the generated metrics to users through the visual indicator. FIG. 11 illustrates one embodiment of the visual indicator 1100. The visual indicator 1100 shows metrics such as top silent 1105, top hiding 1110, likely overconfident 1115, likely people pleasers 1120, top risk-takers 1125, and in the arena 1130 and the users who fall in each category. Users fall in the arena category 1130 are individuals who gave the most feedback and received the most feedback. The individuals are identified in each category because they are in the top 1%, 5%, 10% or other percentages in each category. Individuals fall in one category may also fall in another category. The visual indicator 1100 may include other metrics. The visual indicator 1100 show the metrics and the corresponding users in different durations. For example, the visual indicator 1100 can display the corresponding individuals in the past 30 day, 90 days, one year, or in other duration, Therefore, top silent 1105 may refer to the top 5% of the total employees in the company who gave the least number of feedback messages in the past 90 days, top hiding 1110 may mean refer to the top 5% of the total employees in the company who have participated in the least number of events or meetings in the past 90 days, likely over confident 1115 may refer to the top 5% of the total employees in the company who the analytics software application 115 determined to have the most substantial confidence tone in the past 90 days, likely people pleasers 1120 may refer to the top 5% of the total employees in the company who gave the most positive feedback messages and/or highest feedback ratings in the past 90 days, and top risk-takers 1125 may refer to the top 5% of the total employees in the company who have participated the most events, submitted the most feedback messages and/or ratings, or both in the past 90 days. The feedback software application may be configured to communicate with the analytics software application to access the visual indicator 1100 or information representing the visual indicator 1100 allowing the feedback software application to convey or display that information. The visual indicator 1100 may be made available to everyone on the feedback recipient selection list on the feedback software application, or every employee in the company (available only to the employees of the company, not outsiders).

The analytics software application 115, the visual indicator 1100, and/or information representing the visual indicator 1100 may be implemented as an algorithm or public stream that allows the users of the feedback software application to interact with that application 115, indicator 1100, or information and change or modify the information that is displayed to other employees in the company. Initially, the users interact with the algorithm by preparing and sending feedback to the algorithm. The public stream then starts to generate and update the results as the number of feedback received increases. The users can further interact with the public stream by using the up vote or down vote the messages shown in the public feed (or other applicable commands allowing the users to subsequently rate the messages). The public stream associated with the application 115, indicator 1100, or information is a stream different from the public stream associated with the public feed. This subsequent interaction may remove a certain individual or feedback recipient from the category to which he is classified (e.g., no longer shows on the visual indicator), reclassify him to a different category, or classify someone who previously is not in any category to one of the categories. The feedback software application may be configured to support the public stream, such as having a format to display the visual indicator and pre-stored categories and the thresholds of each category. When the feedback software application communicates with the algorithm or public stream, the feedback software application can retrieve the corresponding categories, place the corresponding individuals in the corresponding categories, and arrange them in a particular order. The user interface on the feedback software application could also change accordingly if the users' subsequent interaction (or the users' subsequent interaction is enough) change the result (e.g., the public stream receives enough up votes or down votes to remove, reclassify, or classify someone).

Figure 12:
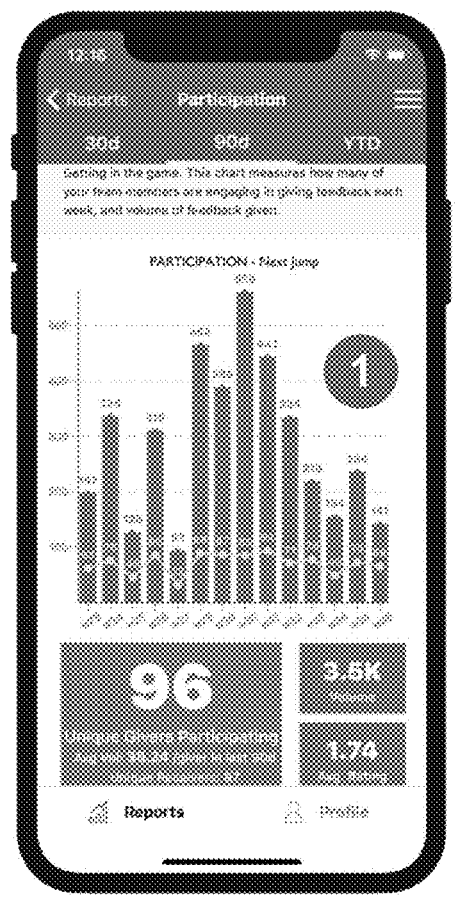
FIG. 12 illustrates one embodiment of the participation report generated by the analytics software application in accordance with some embodiments of the invention.
Figure 12:
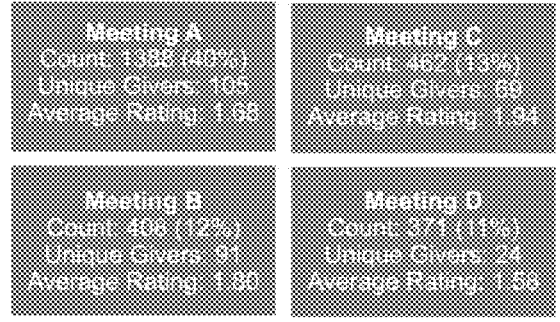

The analytics software application 115 may also generate reports using the feedback giving behavior evaluation process and the learning behavior identification process, such as a participation report and an expectation report. The results in the reports may be grouped by teams (e.g., engineering team A, engineering team B) or divisions (e.g., engineering department, sales department), or be presented on an organization level (e.g., the entire company). FIG. 12 illustrates one embodiment of the participation report that shows active users are giving and receiving feedback and other information. The participation report can show the volume and participation feedback statistics on a weekly, quarterly, or yearly basis. The participation report can also show the number of unique pieces of feedback, unique givers, and unique receivers, and average rating score given. The participation report can further show the top meeting tags, such as Meeting A having a count of 1388 (40%), a number of unique givers of 105, and an average rating of 1.68, Meeting B, having a count of 408 (12%), a number of unique givers of 91, and an average rating of 1.80, Meeting C, having a count of 462 (13%), a number of unique givers of 69, and an average rating of 1.94, and Meeting D, having a count of 371 (11%), a number of unique givers of 24, and an average rating of 1.58.

Figure 13:
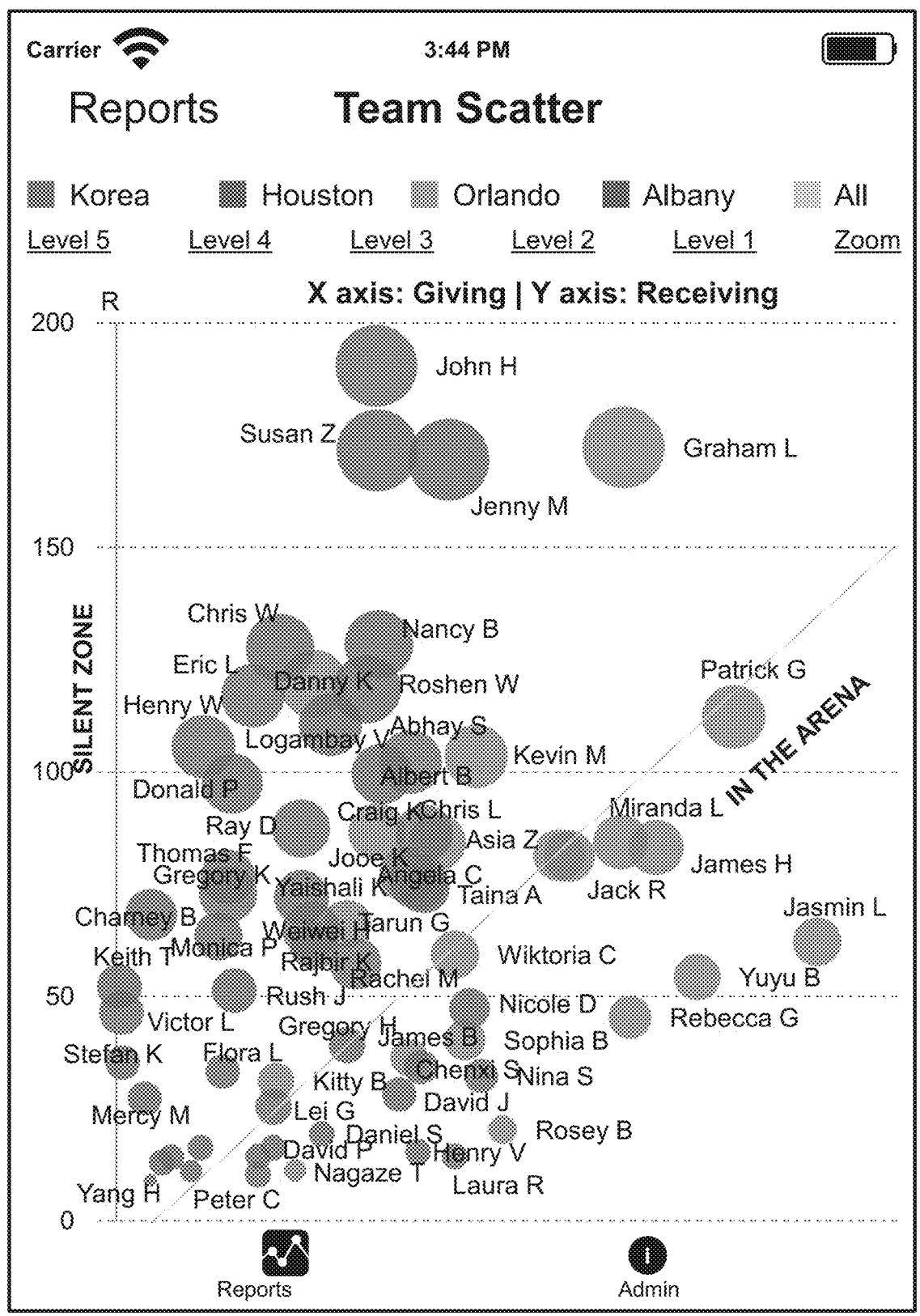
FIG. 13 illustrate another embodiment of the participation report for a particular team in an organization generated by the analytics software application in accordance with some embodiments of the invention.

FIG. 13 illustrate another embodiment of the participation report for a particular team in an organization. The figure shows that most people in the team receive feedback more than give feedback. In the chart, they are closer to the y-axis or silent zone. The figure also shows that some people in the team give feedback more than receive feedback. In the chart, they are closer to the x-axis or hiding zone. The linear line 1305 may represent the best situation where the individual gives and receives about equal number of feedback. The figure shows that some people in the team are the linear line 1305 or near the linear line 1305. The individuals in this team may be located in different offices of the company.

Figure 14:
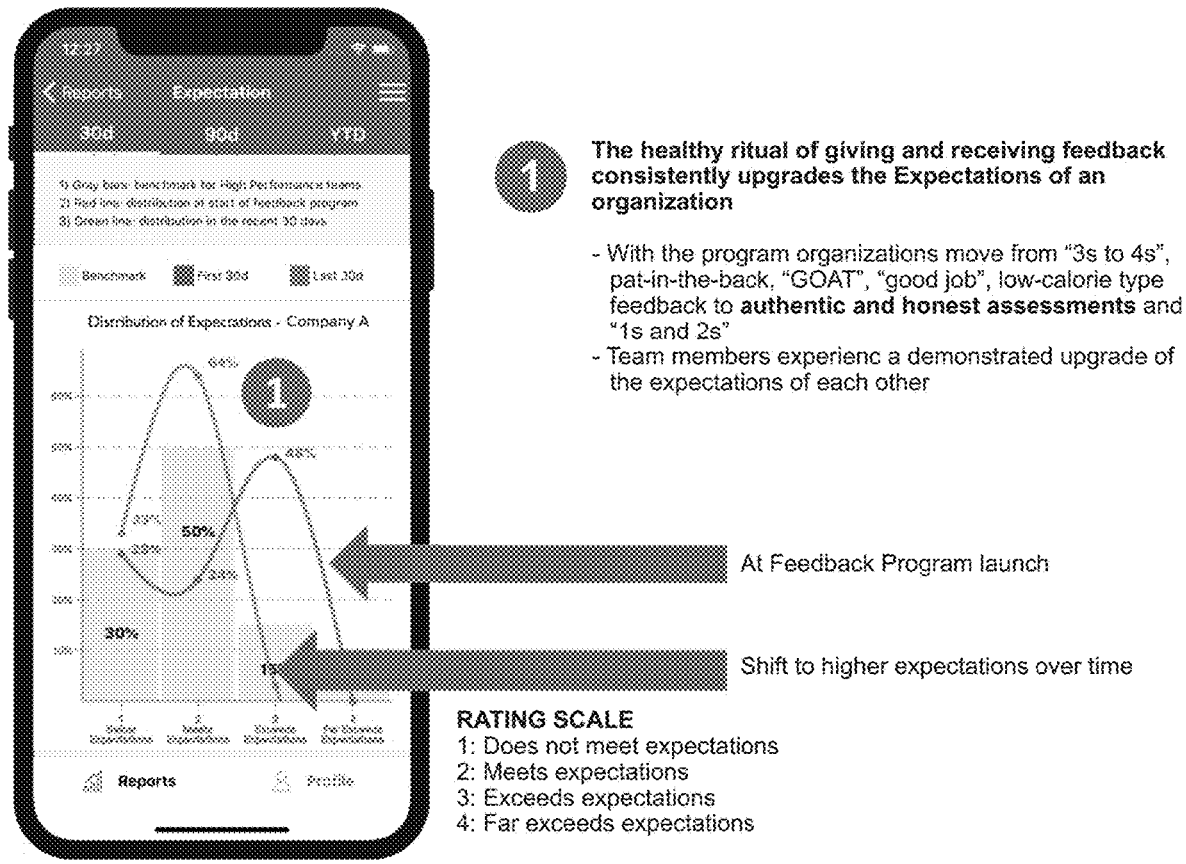
FIG. 14 illustrates one embodiment of the expectation report generated by the analytics software application in accordance with some embodiments of the invention.

FIG. 14 illustrates one embodiment of the expectation report that shows users' learning behavior and their performance have improved overtime. The reports may be generated on a weekly, monthly, or annual basis, or in other frequency. The expectation report shows a first curve (denoted by 29%, 24%, and 48% over time) generated at time A or after the feedback system is used by the company for the first 30 days, and a second curve (denoted by 33%, 64%, and 15% over time) generated at time B or when the feedback system has been used by the company for an year (or based on the feedback system usage in the past 30 days). The expectation report shows that the healthy ritual of giving and receiving feedback consistently upgrades the expectations of a company. The ritual allows the company to move from "3s to 4s," pat-in-the-back, "GOAT," "good job," and low-calorie type feedback to authentic and honest assessments and "1s and 2s." Team members experience a demonstrated upgrade of the expectations of each other.

Figure 15:
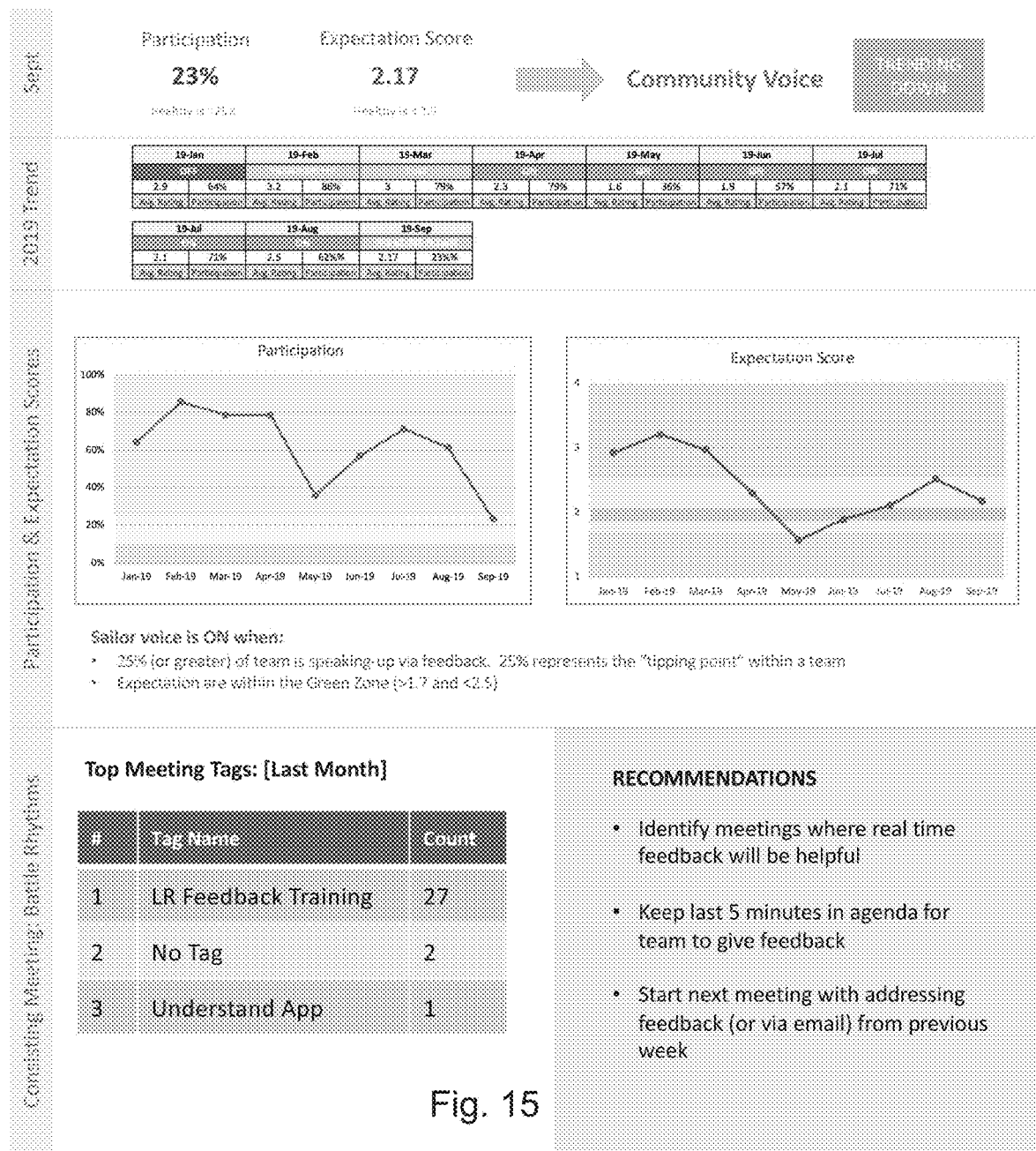
FIG. 15 illustrates one embodiment of the community voice report generated by the analytics software application in accordance with some embodiments of the invention.
Figure 16:
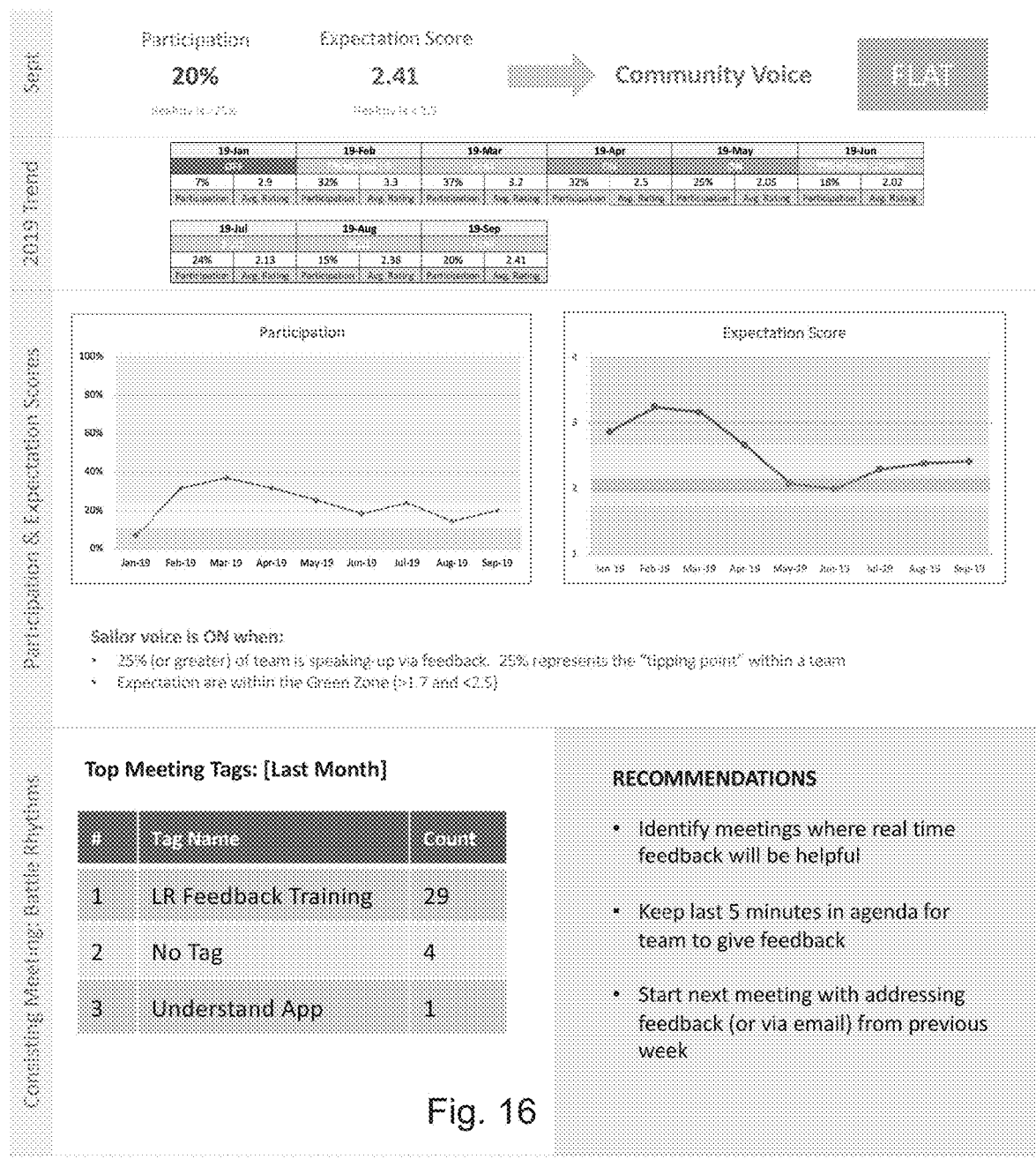
FIG. 16 illustrates another embodiment of the community voice report generated by the analytics software application in accordance with some embodiments of the invention.

FIGS. 15-16 illustrate some embodiments of a community voice report that can also be generated by the analytics software application. Based on the number of people on a team within the company participating in a feedback program or using the feedback software application (participation score), the feedback scores they give (expectation score), or both, the analytics software application can determine certain metrics or identifiers to identify the team's behavior. The metrics or identifiers may include whether the team is using the feedback software application ("voice on" or "voice off"), their feedback behavior is trending upwards, downwards, or flat, and other information. To determine whether the team is using the feedback software application, the analytics software application may be configured to determine whether sufficient people on the team is using the feedback software application, such as greater than a threshold (e.g., 25%). A percentage greater than the threshold is "voice on" and a percentage equal to or less than the threshold is "voice off." To determine whether the team's behavior is trending upwards, downwards, or flat, the analytics software application can use both the participating percentage and the feedback scores they gave to make a determination. A threshold may also be used in calculating the required feedback score to determine the corresponding metric or identifier (e.g., 1.7-2.5). FIG. 15 shows that a team's feedback behavior is trending downwards and FIG. 16 shows that a team's feedback behavior is flat. The community voice report can also show the top meetings based on the number of feedback received, the number of people participated, or both, and recommendations to improve the team's feedback behavior. The community voice report is a report that communicates information on a team level and that is generated for the team leaders to check their team feedback behavior. The community voice report can also be generated based on the information from the participation report (FIG. 12) and the expectation report (FIG. 14).

With respect to the event moderating software application 120, the event moderating software application 120 implements a timer and is configured to set a first duration using the timer for the selected individual or each participant in the meeting on the feedback software application. The event moderating software 120 is also configured to set a second duration using the timer to allow users of the feedback software application to compose a feedback message, select a numerical feedback rating, and send the composed feedback message and the selected numerical feedback rating to the selected individual or participant. The event moderating software is also configured to set a third duration for other individuals (e.g., feedback giving experts) to provide feedback (e.g., numerical feedback rating, oral feedback) to the activity or presentation given in the first duration by the selected individual or participant. The event moderating software application 120 communicates with the feedback software application. In some embodiments, the feedback message composing feature and the feedback numerical rating selecting feature in the feedback software application 105 are controlled by the event moderating software application 120. For example, those two features may be made available to users only in the second duration set by the event moderating software application and are disabled normally. Users cannot compose a feedback message and select a rating for a feedback recipient until the event moderating software 120 activates the second duration. Those two features may be controlled in this manner with respect to composing feedback message and selecting feedback numerical rating for the participants in the event. For other selected individuals, or individuals outside the event, those two features may not have such restrictions.

The event moderating software 120 may set up the time durations in the order described above or in other orders. The event moderating software application 120 may communicate with the feedback processing application software 110 and use the information provided by the feedback processing application software 110 to present results (e.g., the information in the application environment or reporting environment), The event moderating software application 120 may also operate on its own to present results. For example, the event moderating software application 120 may present an average numerical feedback rating for each participant, each other individual's (e.g., feedback judge) numerical feedback rating for each participant, numerical feedback rating comparison between users and other individuals (e.g., feedback judges), numerical feedback rating distribution, the total number of feedbacks each participant has received, and the participant with the highest average numerical feedback rating. These information may be presented at the end of the event. The event moderating software application 120 operates based on the data in the system 150 to keep feedback givers' identities anonymous.

The system may be configured to operate independently and separately from an entity's evaluation system such as an evaluation system used to determine an employee's work performance, promotion, raise, and bonus.

The events and the associated individuals can be created from the feedback software application, the feedback processing software application, the event moderating software application, or a separate software application (e.g., a calendar or meeting schedule app), and be made available to the feedback software application or other software application that require such information. In one embodiment, the feedback software application is configured to communicate with a calendar or meeting schedule (e.g., a calendar or meeting schedule app) of the company (e.g., enterprise computer) to retrieve such information. The enterprise computer can be configured to create the events and include a database storing event information. The feedback software application can reach that database to obtain the relevant information. The event or meeting command on the feedback software application can be updated based on that communication. The event or meeting command (e.g., a button) can be selected to view events or meetings. The communication is performed at the computer level (e.g., through the network connection interface and the communications network which may involve transmission of data packets). The feedback software application can link the feedback messages, feedback ratings, identifiers and other information with the corresponding event, and then collect, aggregate, and present the results in connecting with that event.

The system is configured to operate in real-time. When a feedback giver selects the send command to send the feedback message and numerical feedback rating from the electronic device, the feedback message, numerical feedback rating, and identifiers are transmitted to the servers on which the feedback processing software application is implemented and the feedback processing software application processes the received information the feedback message, numerical feedback rating, and identifiers) and provide them to the public feed, received feed, and sent feed of the feedback software application. The respective users (feedback giver and/or feedback recipient) see the feedback message and average feedback rating in the public feed, the received feed, and the sent feed immediately after the feedback giver selects the send commend. For example, the respective users may see the feedback message and average feedback rating in the feeds in seconds, such as in 2, 5, or 10 seconds or less (including milliseconds), after the feedback giver clicks on the send button. The process(s) performed by the feedback processing software application refers to refers to one or more of the aforementioned storing step (with respect to the first database 145), duplication step, removal step, storing step (with respect to the data cache and retrieval system 150), and updating step. They may further include the step of duplicating and storing the user/sender identifier in the second database 155. The system can perform all these steps in real-time in response to the feedback giver selects the send commend. This paragraph also applies to other commands and feeds selected by the user.

Real time means that the electronic device, server, or other computer system performs an operation at a speed that appears to be instantaneous or near instantaneous (from a human perceived sense of time) in relation to when the device receives the inputs for the operation the composed feedback message, the selected numerical feedback rating, etc.). The device, server, or computer system operates such that the user of the device, server, or computer system (e.g., the author or recipient of the feedback message) perceives the output (e.g., the published and displayed feedback message and average numerical feedback rating) to be produced instantaneously (e.g., without appreciable delay perceived by the user) when the device receives an input or generates data, or is selected to send the received input or generated data. This also applies to sending a request from the electronic device, server, or other computer system to receiving results in the electronic device, server, or other computer system in response to the request. The user of the device, server, or computer system perceives the results to be produced instantaneously when the user sends a request from the device, server, or computer system.

The feedback processing software application and its servers are configured as a service within the enterprise internal data network or domain (e.g., the servers are enterprise servers of a company) The feedback software application is configured to be installed and operate on the mobile application, for example, as an application that is installed using the mobile phone provider's application store. In some implementations, a company may have employees download the application and the application is supported by a vendor using for example a cloud service that stores the submitted feedback and provides the described functionality as a service to the company (e.g., as opposed to installing the software on the company's enterprise servers).

The feedback processing software application is configured in an arrangement in which the feedback software application is configured primarily as an interface for viewing and interacting with the feedback processing software application implemented on the enterprise servers. Preferably, processing or analysis capabilities are configured primarily or substantially only on the servers on which the feedback processing software application is implemented and the feedback software application operates as an interactive viewer and data entry software client (which permits interaction with the servers and the underlying volume of data).

The schema is configured and has relationally linked data elements that are used by the feedback processing software application to quickly assemble different messages, ratings, or responses based on a particular situation. For example, a received request can be converted to a particular query to the service application for an individual employee's received feedback and the data can be retrieved from the retrieval system and second database and converted in a message (one or messages) that are transmitted to the requesting feedback processing software application.

The feedback processing software application and the gateway can be implemented using a cloud application service provider. For example, a cloud provider such as Amazon can be used and the related application, databases, and system can be implemented on Amazon's cloud (e.g., in simple terms, a data center housing servers by the cloud provider that runs applications for cloud provider's customers, e.g., a company that wants to have the cognitive skill development system for their company running in the cloud, and the installation and running of the software is provided as a service to those customers). Cloud-based software applications, servers, or other computer systems allow the electronic device to communicate with the applications, servers, or systems without depending on an enterprise network or intra-network. The user of the electronic device can compose a feedback message and select feedback rating and send both to the applications, servers, or systems from a location different or remote from where the building in which the enterprise network or intra-network is implemented and/or where the individuals are performing an activity. The user can use the feedback software application to communicate with the feedback processing software application and other applications using a local network and/or telecommunication network (e.g., GSM, CDMA, 4G, etc.).

The electronic device of the feedback recipient may notify the recipient when the recipient receives a feedback, such as via a push notification in the status bar of the electronic device, email, text messages, or other forms of notifications.

Anonymity means that a feedback giver's identity is shielded from a feedback recipient. The feedback recipient is not able to identify the feedback giver from the feedback software application or the data provided by the feedback processing software application to the feedback software application. The feedback recipient is also unable to trace the feedback sending process to identify the feedback giver. The data provided by the feedback processing software application to the feedback software application contains no sender identifier or has sender identifier encrypted.

User/sender identifier may also include any other information that identifies the user or sender, rather the identifier, number, or code itself.

The term feedback refers to the entire feedback message including the composed feedback message (the actual text) and the selected numerical feedback rating. In some embodiments, the term can refer to only the composed feedback message or the selected numerical feedback rating. In some embodiments, the system may use only the composed feedback message or the selected numerical feedback rating to perform the above described operations.

The term system refers to the system for developing cognitive skills of individuals rather than the system (e.g., feedback communicating system, feedback processing system, feedback analytics system, or event moderating system) within that system, unless otherwise noted.

The illustrative systems and methods described herein include the embodiments that providing a trusted anonymous system. This is can be important to accomplish because it provides a secure way to allow users to be in "enter" the feedback environment for a particular company, organization, or group while at the same maintaining anonymity within the system. The combination for example can provide anonymity while also maintaining a trusted environment. This gives the users comfort that the other users are their coworkers and not general public that can view feedback or can comment (or troll) the system participants. This could involve checking a current employee directory before providing access to feedback software application or other applications described in this disclosure.

An electronic device may be a desktop computer, laptop computer, a tablet computer, a cellular device, a mobile device, a smartphone, a personal digital assistant (PDA), or other similar computer system having a microprocessor and memory.

The microprocessor may include an application specific integrated circuit (ASIC), programmable logic array (PLA), digital signal processor (DSP), field programmable gate array (FPGA), or any other integrated circuit. The microprocessor may also include one or more of any other applicable processors, such as a system-on-a-chip that combines one or more of a CPU, an application processor, or a reduced instruction set computing (RISC) processor.

Memory may include volatile memory, non-volatile (non-transient) memory, or both. Volatile memory may include cache memory, semi-permanent memory such as RAM, and/or one or more types of memory used for temporarily storing computer data and instructions. Non-volatile memory may include read-only memory (ROM) or other static storage device for storing static information and instructions for the microprocessor. Software applications described in this application feedback software application, feedback processing software, etc.) are implemented as computer instructions that can be stored in memory, and that are executable by or that can configure the microprocessor to perform the functions or steps described herein.

The electronic device also includes a storage device. The storage device may include a hard disk drive and/or a removable storage drive, representing a floppy disk drive, a magnetic tape drive, an optical disk drive, etc.

A network may be a communications network using any suitable communications protocol such as Wi-Fi, 802.11, Bluetooth, radio frequency systems such as 900 MHz, 1.4 GHz, and 5.6 GHz communication systems, infrared, GSM, GSM plus EDGE, CDMA, quadband, and other cellular protocols, VOIP, or any other suitable protocol. The network may also be established by using wires such as an optical fiber or Ethernet cable. A network connection interface may be a hardware device configured to support the above communications protocol such as integrated services digital network (ISDN) card, local area network (LAN) card, Ethernet card, cable modem, satellite modem, or a modem to provide a data communication connection to a corresponding type of telephone line Server refers to a computer system or communication-oriented computer that includes the aforementioned computer components and that usually includes a faster processor, larger memory, larger storage capacity, and general capability of sustaining concurrent data communication with multiple end users, client devices, or the electronic device.

Computer system may refer to either the electronic device, the server, or other computers in this application that include a microprocessor and memory.

Although some disclosure only refers to software applications, it is understood that they also apply to the underlying computer system on which the software application is implemented.

Counterpart method and computer-readable medium embodiments would be understood from the above and the overall disclosure. Also, broader, narrower, or different combinations of the described features are contemplated, such that, for example features can be removed or added in a broadening or narrowing way.

It is understood from the above description that the functionality and features of the systems, devices, or methods of embodiments of the present invention include generating and sending signals to accomplish the actions.

It should be understood that variations, clarifications, or modifications are contemplated. Applications of the technology to other fields are also contemplated.

Exemplary systems, devices, and methods are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention.

Thus, for example, any sequence(s) and/or temporal order of steps of various processes or methods (or sequence of device connections or operation) that are described herein are illustrative and should not be interpreted as being restrictive. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present invention. Moreover, in some discussions, it would be evident to those of ordinary skill in the art that a subsequent action, process, or feature is in response to an earlier action, process, or feature.

It is also implicit and understood that the applications or systems illustratively described herein provide computer-implemented functionality that automatically performs a process or process steps unless the description explicitly describes user intervention or manual operation.

It should be understood that claims that include fewer limitations, broader claims, such as claims without requiring a certain feature or process step in the appended claim or in the specification, clarifications to the claim elements, different combinations, and alternative implementations based on the specification, or different uses, are also contemplated by the embodiments of the present invention It should be understood that combinations of described features or steps are contemplated even if they are not described directly together or not in the same context.

The terms or words that are used herein are directed to those of ordinary skill in the art in this field of technology and the meaning of those terms or words will be understood from terminology used in that field or can be reasonably interpreted based on the plain English meaning of the words in conjunction with knowledge in this field of technology. This includes an understanding of implicit features that for example may involve multiple possibilities, but to a person of ordinary skill in the art a reasonable or primary understanding or meaning is understood.

Software can be implemented as distinct modules or software applications or can be integrated together into an overall application such as one that includes the user interface and that handles other feature for providing the functionality to the user on their device.

It is intended that the specification and examples be considered as exemplary only, with a true scope being indicated by the claims and their equivalents.

The invention claimed is:

1. A system for implementing interactive anonymous feedback comprising:
an electronic device including a microprocessor and memory storing a feedback software application, wherein execution of the feedback software application causes the microprocessor to:
provide a user interface on the electronic device for selecting an individual and entering a feedback message for the individual, wherein the user interface includes a freestyle text area allowing a user of the electronic device to compose the feedback message with own words of the user, a send command allowing the user to send the composed feedback message to a computer system over a network, and an interactive public feed displaying other feedback messages given to other recipients, wherein the public feed allows the user to view the other feedback messages and view corresponding identification of the other recipients of the other feedback messages without displaying sender identifiers of the other feedback messages, wherein the public feed displays an interactive vote command allowing the user to select up vote or down vote for the other feedback messages displayed in the public feed; and
wherein the electronic device further includes a network connection interface that allows the electronic device to communicate with the computer system over the network, and is configured by the feedback software application to transmit the composed feedback message and a sender identifier identifying the user who composed the message to the computer system over the network via the network connection interface in response to the user selecting the send command;
a server including a microprocessor, a memory storing a feedback processing software application, and a network connection interface that allows the server to communicate over the network, wherein execution of the feedback processing software application allows the server's microprocessor to:
receive data that includes the composed feedback message and the sender identifier over the network via the network connection interface of the server;
communicate with an employee database of an institution containing employee identity information and obtain a list from the employee database; and
establish an application environment including a service application, a first database, and a data cache and retrieval system;
wherein the service application is configured to:
save the received data in the first database;
duplicate the received data, remove the sender identifier from the duplicated data, and save the duplicated data without the sender identifier to the data cache and retrieval system; and
transmit the composed feedback message from the data cache and retrieval system to the electronic device;
wherein the first database is implemented with security configuration that prevents unauthorized access to the sender identifier, and the security configuration implemented on the first database includes application level and database level restrictions, wherein the application level restrictions limit software applications that can read from and write into the first database and the database level restrictions limit users who can access the first database;
wherein the data cache and retrieval system is configured to store the duplicated data without the sender identifier, and wherein the data cache and retrieval system is configured to generate a search index of written feedback in the stored duplicated data, without the sender identifier, comprising the other feedback messages, and use the search index to deliver portions of the duplicated data to end users, and allow the service application to access the stored duplicated data without the sender identifier using the index, and the data cache and retrieval system is configured to temporarily store portions of the duplicated data and provide the portions of the duplicated data, to be transmitted by the service application, without the sender identifier, that has been previously accessed by the service application to send the duplicated data, without the sender identifier, to electronic devices; and
wherein the service application is further configured to:
transmit the duplicated data without the sender identifier in the data cache and retrieval system to the electronic device and other electronic devices implemented with the feedback software application, wherein the duplicated data without the sender identifier includes the composed feedback message; and
allow the electronic device and the other electronic devices to display the feedback message and identity of a recipient of the feedback message in the public feed without showing the sender identifier, such that the identity of the user or feedback message sender is unknown to other users of the other electronic devices and the recipient, and
wherein the user interface further includes an interactive feedback rating scale allowing the user of the electronic device to select a feedback rating for the recipient, and the selected feedback rating is transmitted to the server with the feedback message, sent to the electronic device from the server with the feedback message, and displayed on the public feed with the feedback message.

2. The system of claim 1, wherein the user interface includes a list of individuals selectable as a feedback message recipient, and name of the user of the electronic device or feedback message sender appears in the list of individuals selectable as the feedback message recipient.

3. The system of claim 1, wherein the execution of the feedback software application causes the server's microprocessor to authenticate the user of the electronic device or feedback message sender before providing access to the user interface, wherein the authenticating requires the user or sender to enter a user ID and a password and checks the entered user ID and password with information stored in an authentication system.

4. The system of claim 1, wherein the execution of the feedback processing software application further allows the microprocessor of the server to transmit the duplicated data without the sender identifier to the electronic device for displaying on the public feed in response to a request sent by the public feed.

5. The system of claim 1, wherein the execution of the feedback processing software application further allows the microprocessor of the server to establish a reporting environment that is configured to access data in the data cache and retrieval system and perform a sentiment analysis on the composed feedback message.

6. The system of claim 5, further comprising a second electronic device including a microprocessor and memory storing an analytics software application, wherein execution of the analytics software application allows the microprocessor of the second electronic device to:
communicate with the server and the feedback processing software application implemented on the server; and
evaluate individuals feedback giving behavior and evaluate those individuals based on respective feedback messages they composed.

7. The system of claim 6, wherein the evaluating includes analyzing the composed feedback message by using large sets of terms, words, and synonyms, generating metrics representing user's feedback giving empathy and authenticity and user's learning behavior, identifying which users fall under each generated metric using the analysis, and communicating a visual indicator showing the generated metrics and the identified users under the each generated metric.

8. The system of claim 6, wherein the memory of the server further comprises an event moderating software application and execution of the event moderating software application allows the microprocessor of the server to:
implement a timer that is configured to:
set a first duration using the timer for a person listed on the user interface of the feedback software application to perform an activity;
set a second duration using the timer for a first group of users to compose a feedback message on the feedback software application for the activity performed by the person; and
set a third duration using the timer for a second group of users that is different from the first group to compose an additional feedback message on the feedback software application for the activity performed by the person.

9. The system of claim 8, wherein execution of the event moderating software application further allows the microprocessor of the server to:
communicate with a plurality of electronic devices implemented with the feedback software application; and
enable and disable functionalities of the freestyle text area and send command in the plurality of electronics devices, wherein the event moderating software enables the functionalities of the freestyle text area and send command so that specific users can compose a specific message in the freestyle text area and select the send command only in the second and third durations.

10. The system of claim 9, wherein the data received by the server includes particular feedback messages and identifiers received from the second and third durations.

11. The system of claim 9, wherein execution of the event moderating software application further allows the microprocessor of the server to access the sentiment analysis by the feedback processing software application and communicate the sentiment analysis to the users through visual representations.

12. The system of claim 5, wherein the sender identifier is encrypted by the data cache and retrieval system using a public key and is accessible by the reporting environment.

13. The system of claim 12, wherein the reporting environment uses the encrypted sender identifier to identify particular feedback messages from the user corresponding to the sender identifier and performs the sentiment analysis on the identified particular feedback messages without knowing identity of the user.

14. A method for implementing interactive anonymous feedback comprising:
providing a user interface on an electronic device for selecting an individual and entering a feedback message for the individual, wherein the user interface includes a freestyle text area allowing a user of the electronic device to compose the feedback message with own words of the user and a send command allowing the user to send the composed feedback message to a computer system over a network, and displaying a public feed comprising other feedback messages given to other recipients, wherein the public feed allows the user to view the other feedback messages and view corresponding identification of the other recipients of the other feedback messages without displaying sender identifiers of the other feedback messages, wherein the public feed displays an interactive vote command allowing the user to select up vote or down vote for the other feedback messages displayed in the public feed;
transmitting the composed feedback message and a sender identifier identifying the user who composed the message over the network via a network connection interface of the electronic device in response to the user selecting the send command;
receiving data at a server that includes the composed feedback message and the sender identifier over the network via the network connection interface of the server;
communicating with an employee database of an institution containing employee identity information and obtain a list from the employee database; and
establishing an application environment including a service application, a first database, and a data cache and retrieval system;
wherein the service application is configured to:
save the received data in the first database;
duplicate the received data, remove the sender identifier from the duplicated data, and save the duplicated data without the sender identifier to the data cache and retrieval system; and
transmit the composed feedback message from the data cache and retrieval system to the electronic device;
wherein the first database is implemented with security configuration that prevents unauthorized access to the sender identifier, and the security configuration implemented on the first database includes application level and database level restrictions, wherein the application level restrictions limit software applications that can read from and write into the first database and the database level restrictions limit users who can access the first database;
wherein the data cache and retrieval system is configured to store the duplicated data without the sender identifier, and wherein the data cache and retrieval system is configured to generate a search index of written feedback in the stored duplicated data, without the sender identifier, and allow the service application to access the stored duplicated data without the sender identifier using the index, and the data cache and retrieval system is configured to temporarily store portions of the duplicated data and provide the portions of the duplicated data, to be transmitted by the service application, without the sender identifier that has been previously accessed by the service application to send the duplicated data, without the sender identifier, to electronic devices; and wherein the service application is further configured to:
transmit the duplicated data without the sender identifier in the data cache and retrieval system to the electronic device and other electronic devices implemented, wherein the duplicated data without the sender identifier includes the composed feedback message; and allow the electronic device and the other electronic devices to display the feedback message and identity of a recipient of the feedback message in the public feed without showing the sender identifier, such that the identity of the user or feedback message sender is unknown to other users of the other electronic devices and the recipient; and wherein the user interface further includes an interactive feedback rating scale allowing the user of the electronic device to select a feedback rating for the recipient, and the selected feedback rating is transmitted to the server with the feedback message, sent to the electronic device from the server with the feedback message, and displayed on the public feed with the feedback message.

15. A non-transitory computer readable medium storing one or more software applications that causes a computer system to execute a method, the method comprising:

providing a user interface on an electronic device for selecting an individual and entering a feedback message for the individual, wherein the user interface includes a freestyle text area allowing a user of the electronic device to compose the feedback message with own words of the user, a send command allowing the user to send the composed feedback message to the computer system over a network, and displays a public feed comprising other feedback messages given to other recipients, wherein the public feed allows the user to view the other feedback messages and view corresponding identification of the other recipients of the other feedback messages without displaying sender identifiers of the other feedback messages, wherein the public feed displays an interactive vote command allowing the user to select up vote or down vote for the other feedback messages displayed in the public feed;

transmitting the composed feedback message and a sender identifier identifying the user who composed the message to the computer system over the network via a network connection interface of the electronic device in response to the user selecting the send command;

receiving data at a server that includes the composed feedback message and the sender identifier over the network via the network connection interface of the server;

communicating with an employee database of an institution containing employee identity information and obtain a list from the employee database; and establishing an application environment including a service application, a first database, and a data cache and retrieval system;

wherein the service application is configured to:
save the received data in the first database;
duplicate the received data, remove the sender identifier from the duplicated data, and save the duplicated data without the sender identifier to the data cache and retrieval system; and
transmit the composed feedback message from the data cache and retrieval system to the electronic device;

wherein the first database is implemented with security configuration that prevents unauthorized access to the sender identifier, and the security configuration implemented on the first database includes application level and database level restrictions, wherein the application level restrictions limit software applications that can read from and write into the first database and the database level restrictions limit users who can access the first database;

wherein the data cache and retrieval system is configured to store the duplicated data without the sender identifier, and wherein the data cache and retrieval system is configured to generate a search index of written feedback in the stored duplicated data, without the sender identifier, comprising the other feedback messages, use the search index to deliver portions of the duplicated data to end users, and allow the service application to access the stored duplicated data without the sender identifier using the index, and the data cache and retrieval system is configured to temporarily store portions of the duplicated data and provide the portions of the duplicated data, to be transmitted by the service application, without the sender identifier, that has been previously accessed by the service application to send the duplicated data, without the sender identifier, to electronic devices; and wherein the service application is further configured to:
transmit the duplicated data without the sender identifier in the data cache and retrieval system to the electronic device and other electronic devices implemented, wherein the duplicated data without the sender identifier includes the composed feedback message; and allow the electronic device and the other electronic devices to display the feedback message and identity of a recipient of the feedback message in the public feed without showing the sender identifier, such that the identity of the user or feedback message sender is unknown to other users of the other electronic devices and the recipient; and wherein the user interface further includes an interactive feedback rating scale allowing the user of the electronic device to select a feedback rating for the recipient, and the selected feedback rating is transmitted to the server with the feedback message, sent to the electronic device from the server with the feedback message, and displayed on the public feed with the feedback message.

16. The method of claim 14, wherein the user interface includes a list of individuals selectable as a feedback message recipient, and name of the user of the electronic device or feedback message sender appears in the list of individuals selectable as the feedback message recipient.

17. The method of claim 14, wherein the server further includes a microprocessor and memory storing a feedback processing software application.

18. The method of claim 17, wherein execution of the feedback processing software application allows the microprocessor of the server to establish a reporting environment that is configured to access data in the data cache and retrieval system and perform a sentiment analysis on the composed feedback message.

19. The method of claim 18, further providing a second electronic device including a microprocessor and memory storing an analytics software application, wherein execution of the analytics software application allows the microprocessor of the second electronic device to:
  communicate with the server and the feedback processing software application implemented on the server; and
  evaluate individuals feedback giving behavior and evaluate those individuals based on respective feedback messages they composed.

20. The method of claim 19, wherein the memory further comprises an event moderating software application and execution of the event moderating software application allows the microprocessor of the server to:
  implement a timer that is configured to:
    set a first duration using the timer for a person listed on the user interface of the feedback software application to perform an activity;
    set a second duration using the timer for a first group of users to compose a feedback message on the feedback software application for the activity performed by the person; and
    set a third duration using the timer for a second group of users that is different from the first group to compose an additional feedback message on the feedback software application for the activity performed by the person.

21. The non-transitory computer readable medium of claim 15, wherein the user interface includes a list of individuals selectable as a feedback message recipient, and name of the user of the electronic device or feedback message sender appears in the list of individuals selectable as the feedback message recipient.

22. The non-transitory computer readable medium of claim 15, wherein the server further includes a microprocessor and memory storing a feedback processing software application.

23. The non-transitory computer readable medium of claim 22, wherein execution of the feedback processing software application allows the microprocessor of the server to establish a reporting environment that is configured to access data in the data cache and retrieval system and perform a sentiment analysis on the composed feedback message.

24. The non-transitory computer readable medium of claim 23, wherein the method further comprises providing a second electronic device including a microprocessor and memory storing an analytics software application, wherein execution of the analytics software application allows the microprocessor of the second electronic device to:
  communicate with the server and the feedback processing software application implemented on the server; and
  evaluate individuals feedback giving behavior and evaluate those individuals based on respective feedback messages they composed.

25. The non-transitory computer readable medium of claim 24, wherein the memory further comprises an event moderating software application and execution of the event moderating software application allows the microprocessor of the server to:
  implement a timer that is configured to:
    set a first duration using the timer for a person listed on the user interface of the feedback software application to perform an activity;
    set a second duration using the timer for a first group of users to compose a feedback message on the feedback software application for the activity performed by the person; and
    set a third duration using the timer for a second group of users that is different from the first group to compose an additional feedback message on the feedback software application for the activity performed by the person.

\* \* \* \* \*